(12) United States Patent
Liu et al.

(10) Patent No.: US 12,280,805 B2
(45) Date of Patent: Apr. 22, 2025

(54) OPERATIONAL DESIGN DOMAIN (ODD) DETERMINING METHOD AND APPARATUS AND RELATED DEVICE

(71) Applicant: Shenzhen Yinwang Intelligent Technologies Co., Ltd., Shenzhen (CN)

(72) Inventors: Hang Liu, Beijing (CN); Mingchao Li, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 364 days.

(21) Appl. No.: 17/827,178

(22) Filed: May 27, 2022

(65) Prior Publication Data

US 2022/0289252 A1 Sep. 15, 2022

Related U.S. Application Data

(63) Continuation of application No. PCT/CN2020/098270, filed on Jun. 24, 2020.

(30) Foreign Application Priority Data

Nov. 28, 2019 (CN) .......................... 201911195545.1

(51) Int. Cl.
*B60W 60/00* (2020.01)

(52) U.S. Cl.
CPC .. *B60W 60/00184* (2020.02); *B60W 60/0053* (2020.02); *B60W 2510/0638* (2013.01); *B60W 2552/20* (2020.02)

(58) Field of Classification Search
None
See application file for complete search history.

(56) References Cited

U.S. PATENT DOCUMENTS

2013/0336174 A1 12/2013 Rubin et al.
2015/0069831 A1 3/2015 Kesler et al.
(Continued)

FOREIGN PATENT DOCUMENTS

CN 105473408 A 4/2016
CN 105808557 A 7/2016
(Continued)

OTHER PUBLICATIONS

Krzysztof Czarnecki, "Operational Design Domain for Automated Driving Systems-Taxonomy of Basic Terms," WISE Requirements Analysis Framework for Automated Driving Systems, Jul. 21, 2018, 23 pages.
(Continued)

*Primary Examiner* — Peter D Nolan
*Assistant Examiner* — Jacob Kent Besteman-Street
(74) *Attorney, Agent, or Firm* — Conley Rose, P.C.

(57) ABSTRACT

A method includes determining an operational design domain (ODD) of a target road section where an automated driving system is located, where a first parameter set corresponding to the ODD includes a first environmental parameter set or a first operating parameter set of the automated driving system, obtaining a second parameter set, where the second parameter set includes a second environmental parameter set or a second operating parameter set, the second environmental parameter set is a set of environmental parameters of the automated driving system on the target road section, and the second operating parameter set is a set of operating parameters of the automated driving system on the target road section, and when it is identified that the second parameter set is a subset of the first parameter set, determining that the automated driving system does not exceed the ODD of the target road section.

20 Claims, 19 Drawing Sheets

(56) References Cited

U.S. PATENT DOCUMENTS

| | | |
|---|---|---|
| 2016/0121907 A1 | 5/2016 | Otake |
| 2016/0200317 A1 | 7/2016 | Danzl et al. |
| 2018/0290652 A1* | 10/2018 | Kindo ............. B60W 60/00186 |
| 2019/0163185 A1* | 5/2019 | Bin-Nun ................ G07C 5/085 |
| 2019/0315346 A1* | 10/2019 | Yoo ....................... B60W 50/12 |
| 2019/0317492 A1 | 10/2019 | Choi et al. |
| 2019/0329768 A1 | 10/2019 | Shalev-Shwartz et al. |
| 2019/0369637 A1 | 12/2019 | Shalev-Shwartz et al. |
| 2020/0098269 A1 | 3/2020 | Wray et al. |
| 2020/0162854 A1 | 5/2020 | Wang et al. |
| 2020/0180659 A1 | 6/2020 | Yu et al. |
| 2020/0269839 A1* | 8/2020 | Sato ................ B60W 30/18163 |
| 2021/0014902 A1 | 1/2021 | Guo et al. |
| 2021/0109528 A1* | 4/2021 | Heyl .................. B60W 60/0018 |
| 2021/0149395 A1* | 5/2021 | Jonsson ............. B60W 50/082 |
| 2021/0150897 A1* | 5/2021 | Jonsson .......... B60W 30/18018 |

FOREIGN PATENT DOCUMENTS

| | | |
|---|---|---|
| CN | 108646738 A | 10/2018 |
| CN | 109041078 A | 12/2018 |
| CN | 109358614 A | 2/2019 |
| CN | 109606385 A | 4/2019 |
| CN | 109795505 A | 5/2019 |
| CN | 110109453 A | 8/2019 |
| CN | 110312309 A | 10/2019 |
| CN | 110356413 A | 10/2019 |
| CN | 110383008 A | 10/2019 |
| CN | 110418743 A | 11/2019 |
| CN | 110462544 A | 11/2019 |
| EP | 2020494 A1 | 2/2009 |
| EP | 3276590 A1 | 1/2018 |
| EP | 3361697 A1 | 8/2018 |
| JP | H08238952 A | 9/1996 |
| JP | 2007022431 A | 2/2007 |

OTHER PUBLICATIONS

Ian Colwell, "Runtime Restriction of the Operational Design Domain: A Safety Concept for Automated Vehicles," Waterloo, Ontario, Canada, 2018, 90 pages.

Gu Xiaochuan et al., "Research on Path Following Control Method for Autonomous Driving Vehicle," 2019, with an English abstract, 7 pages.

* cited by examiner

Road section 4

OPERATIONAL DESIGN DOMAIN (ODD) DETERMINING METHOD AND APPARATUS AND RELATED DEVICE

CROSS-REFERENCE TO RELATED APPLICATIONS

This is a continuation of International Patent Application No. PCT/CN2020/098270 filed on Jun. 24, 2020, which claims priority to Chinese Patent Application No. 201911195545.1 filed on Nov. 28, 2019. The disclosures of the aforementioned applications are hereby incorporated by reference in their entireties.

TECHNICAL FIELD

This disclosure relates to the unmanned driver field, and in particular, to an operational design domain (ODD) determining method and apparatus, and a related device.

BACKGROUND

In the Society of Automotive Engineers (SAE) J3016 standard, driving automation levels of a vehicle include L0 to L5, respectively corresponding to five levels from no driving automation to full driving automation, and include: Level 0 driving automation (no driving automation), Level 1 driving automation (driver assistance), Level 2 driving automation (partial driving automation), Level 3 driving automation (conditional driving automation), Level 4 driving automation (high driving automation), and Level 5 driving automation (full driving automation). Whether an automated driving system can continuously perform lateral or longitudinal vehicle motion control in a dynamic driving task within a corresponding ODD, and whether the automated driving system can detect and respond to targets and events appropriate to the lateral or longitudinal motion control are important bases for driving automation classification. It may be understood that the ODD may not be set in Level 0 driving automation, and usually, the ODD may not be limited in Level 5 driving automation.

According to the SAE J3016 standard, an operational design condition, or an operational design area or the ODD, is an operating condition under which an automated driving system or an automated driving feature is designed to operate, that is, an operating condition of an automated driving function. For example, the operating condition may include but is not limited to environmental, geographic, and time-of-day restrictions, traffic or roadway characteristics, and a status (for example, an operating speed) of a vehicle in an automated driving system is installed. The ODD further includes a feature of the system, for example, one or more of a sensing capability, a decision capability, and an execution capability for operating an automated driving function.

Therefore, in the automated driving system, it is a problem to be urgently resolved to determine whether a current actual operating domain meets an ODD.

SUMMARY

Embodiments of the present disclosure provide an ODD determining method and a related device, to determine whether an automated driving system is within an ODD.

According to a first aspect, an embodiment of the present disclosure provides an ODD determining method, where the method includes determining an ODD of a target road section where an automated driving system is located, where a first parameter set corresponding to the ODD includes a first environmental parameter set and/or a first operating parameter set of the automated driving system, obtaining a second parameter set, wherein the second parameter set includes a second environmental parameter set and/or a second operating parameter set, the second environmental parameter set is a set of environmental parameters of the automated driving system on the target road section, and the second operating parameter set is a set of operating parameters of the automated driving system on the target road section, and determining, when it is identified that the second parameter set is a subset of the first parameter set, that the automated driving system does not exceed the ODD of the target road section.

In this embodiment of the present disclosure, the ODD (for example, the ODD of a stretch of highway where the automated driving system is located is a sunny day, a road with lane lines, and a vehicle speed not higher than a value) of the automated driving system of the vehicle on the target road section (a stretch of road that includes a start point and an end point, for example, the stretch of highway) is determined, and the second parameter set (including the second environmental parameter set, or the second operating parameter set, or the second environmental parameter set and the second environmental parameter set) obtained by the automated driving system is compared with the first parameter set (including the first environmental parameter set, or the first operating parameter set, or the first environmental parameter set and the first operating parameter set) corresponding to the ODD. When it is identified that the second parameter set is a subset of the first parameter set (for example, the second parameter set is a sunny day, detected lane lines, and a vehicle speed 80 kilometers per hour (km/h), and meets ODD requirements of the highway), it is determined that the automated driving system does not exceed the ODD of the road section on the current target road section. That is, on the target road section, factors such as a condition of the vehicle/automated driving system and a condition of a running environment all within the preset ODD. Each parameter included in the first parameter set is a preset parameter, a parameter value, a value range, and/or the like that are/is compared with the obtained second parameter set (for example, a vehicle speed not higher than a value is a speed requirement designed for a road section on a specific highway, and the requirement is used as a reference). Further, the second environmental parameter set may include a weather condition such as a sunny day and a rainy day, traffic information, road information, object information such as a pedestrian, a bicycle, and a speed limit sign, and the like. The second operating parameter set may include various data of the automated driving system or the vehicle, such as a vehicle speed, a computing capability, and a storage capability. It is determined, by identifying parameters, whether the vehicle exceeds an operating condition, and when the vehicle exceeds the operating condition, a corresponding response policy such as stopping, slowing down, or requesting a driver to take over to enter a manual driving state is taken in time, to ensure safe running of the autonomous vehicle.

In a possible implementation, the second parameter set includes the second environmental parameter set and the second operating parameter set, and the first parameter set includes the first environmental parameter set and the first operating parameter set, and determining, when it is identified that the second parameter set is a subset of the first parameter set, that the automated driving system does not exceed the ODD of the target road section includes, when it is identified that the second environmental parameter set is a subset of the first environmental parameter set and the second operating parameter set is a subset of the first operating parameter set, determining that the automated driving system does not exceed the ODD of the target road section. In this embodiment of the present disclosure, when the first parameter set corresponding to the ODD includes the first environmental parameter set and the first operating parameter set, and the obtained second parameter set includes the second environmental parameter set and the second operating parameter set, if it is identified that the second environmental parameter set (for example, light intensity 1000 lux (lx)) is a subset of the first environmental parameter set (for example, light intensity 500 lx to 2000 lx) and the second operating parameter set (for example, a vehicle speed 50 km/h) is a subset of the first operating parameter set (for example, a vehicle speed 40 km/h to 80 km/h), it may be determined that the automated driving system does not exceed the ODD of the target road section. That is, when all elements in the second parameter set may be determined in the first parameter set, it may be determined that the automated driving system does not exceed the ODD. A current operating condition of the vehicle can be accurately determined by data identification from two dimensions, environmental parameters and operating parameters, to avoid misjudgment of the ODD.

In a possible implementation, obtaining a second parameter set includes receiving ODD indication information sent by a road side unit or a cloud platform, and determining, based on the ODD indication information, the second parameter set corresponding to the ODD. In this embodiment of the present disclosure, the ODD indication information (for example, an ODD level of the road section is 1) of the road section is obtained through communication between the vehicle and the road side unit and/or the cloud platform. The vehicle determines, based on the ODD indication information (for example, the ODD level is 1) and a stored mapping relationship between the ODD indication information and the second parameter set, the second parameter set corresponding to the indication information. The automated driving system may update an environment status of the automated driving system on the target road section in a timely manner by exchanging information with an intelligent device (for example, the road side unit) on the road and a cloud through a network, to prevent the automated driving system of the vehicle from operating out of the ODD. That is, the automated driving system is prevented from operating in a case in which the current operating condition on the target road section is not met, for example, a case in which the vehicle is still running on a road on which traffic control occurs.

In a possible implementation, obtaining a second parameter set includes obtaining an element in the second parameter set and a value corresponding to the element by using a sensor of the vehicle, a road side unit, or a cloud platform, or obtaining an element in the second parameter set by using a sensor of the vehicle, a road side unit, or a cloud platform. In this embodiment of the present disclosure, the sensor (for example, a millimeter wave radar, multi-line lidar, and a panoramic camera) mounted on the vehicle obtains real-time images around the vehicle, a distance between the vehicle and an obstacle, and the like. The road side unit and the cloud platform obtain weather conditions, control information, and the like, to ensure that the vehicle can obtain latest road section-related information in real time.

In a possible implementation, the first operating parameter includes a speed of the vehicle. In this embodiment of the present disclosure, an important basic parameter of the vehicle such as the speed is added to the preset first operating parameter, to meet requirements of most road sections and driving scenarios.

In a possible implementation, the first parameter set corresponds to the target road section. In this embodiment of the present disclosure, different road sections correspond to different first parameter sets. For example, the target road section may correspond to a highway, a residential road, or a rural road. The highway has a corresponding ODD, the residential road has a corresponding ODD, and the rural road has a corresponding ODD. For another example, on a highway, a section A and a section B may also correspond to different ODDs (for example, the sections A and B may have different speed limits). Based on characteristics of different road sections, different ODDs are configured for the different road sections to ensure safety and effectiveness of automated driving.

In a possible implementation, the first parameter set is a set stored in a database corresponding to the target road section. That is, the first parameter set is stored in the database corresponding to the target road section. It may be understood that, based on characteristics of different road sections, the different road sections may correspond to different databases that are used to store environmental parameters on the road sections, for example, environmental objects or parameters (for example, speed limit signs or traffic lights) on the road sections. In this embodiment of the present disclosure, the first parameter set is stored in a database corresponding to a road section, and a plurality of first parameter sets corresponding to a plurality of road sections may be stored in one database, or may be stored in a plurality of databases. The vehicle end stores a database in which the first parameter set is located, and may recognize the obtained data in a timely manner.

In a possible implementation, the method further includes determining, when it is identified that the second environmental parameter set is not a subset of the first environmental parameter set or the second operating parameter set is not a subset of the first operating parameter set, that the automated driving system exceeds the ODD of the target road section. In this embodiment of the present disclosure, in a case in which the first parameter set corresponding to the ODD includes the first environmental parameter set, when it is identified that the second environmental parameter set (for example, a rainy day) is not a subset of the first environmental parameter set (for example, a sunny day), or in a case in which the first parameter set corresponding to the ODD includes the first operating parameter set, when it is identified that the second operating parameter set (for example, a graphics processing unit (GPU) computing power of the automated driving system is 5 TOPS) is not a subset of the first operating parameter set (for example, on a current road shared by pedestrians and vehicles, a GPU computing power of the automated driving system needs to be greater than 10 TOPS), it is determined that the automated driving system exceeds the ODD of the target road section. Not only a case in which the automated driving system is within the ODD is determined, but also a case in which the automated driving system exceeds the ODD is determined, to improve a determining capability of the vehicle and cope with complex and volatile road conditions and running conditions.

In a possible implementation, the first operating parameter set includes one or more first operating parameters and first value ranges corresponding to the one or more first operating parameters, and the second operating parameter set includes one or more second operating parameters and second values corresponding to the one or more second operating parameters, and determining, when it is identified that the second operating parameter set is not a subset of the first operating parameter set, that the automated driving system exceeds the ODD of the target road section includes, when the second operating parameter is the same as the first operating parameter, and it is identified that the second value is not within the first value range, determining that the automated driving system exceeds the ODD of the target road section. In this embodiment of the present disclosure, the first operating parameter set may further include the first operating parameter and a value or a value range corresponding to the parameter. As long as an operating parameter does not meet a requirement of the foregoing preset value or value range, it is determined that the automated driving system exceeds the ODD on the road section. For example, different road sections have requirements on the vehicle speed, but require different speed values. The identification and determining of this content facilitates accurate analysis of whether an operating parameter of the vehicle accurately matches a condition of the current road section on the current road section and an environment.

In a possible implementation, the first environmental parameter set includes one or more preset first objects, and the second environmental parameter set includes one or more second objects, and determining, when it is identified that the second environmental parameter set is not a subset of the first environmental parameter set, that the automated driving system exceeds the ODD of the target road section includes, when it is identified that at least one second object in the second environmental parameter set is different from any first object in the first environmental parameter set, determining that the automated driving system exceeds the ODD of the target road section. Optionally, the first object includes a preset data feature of a target, for example, a data feature of a traffic light or a data feature of a pedestrian. When it is identified that a data feature of the target does not match the preset data feature, it is determined that the automated driving system exceeds the ODD on the road section. By recognizing object features, the vehicle can accurately identify the environment outside the vehicle. Optionally, it may be identified, based on one or more determining criteria, that the second object is the same as or different from the first object. For example, when a matching degree is greater than a specific threshold, it is determined that the first object is the same as the second object.

In a possible implementation, the first environmental parameter set includes one or more preset first objects and value ranges corresponding to the one or more first object, and the second environmental parameter set includes one or more second objects and values corresponding to the one or more second objects, and determining, when it is identified that the second environmental parameter set is not a subset of the first environmental parameter set, that the automated driving system exceeds the ODD of the target road section includes, when it is identified that the second object is the same as the first object, and a value corresponding to the second object is not within a value range corresponding to the first object, determining that the automated driving system exceeds the ODD of the target road section. In this embodiment of the present disclosure, whether the automated driving system exceeds the ODD on the road section is determined by identifying a specific value corresponding to an object. For example, the vehicle may run slowly on a road section 1 on a snowy day, and a snowfall may be between 0.1 mm to 2.4 mm or less (all snowfalls in the following are 24-hour snowfalls). The vehicle may run slowly on a road section 2 on a snowy day, only if a snowfall is less than 0.1 millimeters (mm). Both ODDs of the road section 1 and the road section 2 specify the snowfall, and the vehicle determines whether an obtained current snowfall is within the ranges, to accurately respond based on dynamic factors such as weather.

In a possible implementation, after it is determined that the automated driving system exceeds the ODD of the target road section, the method further includes reducing the speed of the vehicle, or requesting a driver of the vehicle to take over, or controlling the vehicle to stop running. In this embodiment of the present disclosure, the vehicle is controlled by stopping or slowing down, to perform a corresponding action after the vehicle exceeds the ODD, to ensure safe running of the vehicle.

According to a second aspect, an embodiment of the present disclosure provides an ODD determining method, applied to an automated driving system of a vehicle. The method includes determining a third environmental parameter set of a target road section where the automated driving system is located, where the third environmental parameter set and a first environmental parameter set in a first parameter set corresponding to an ODD of the target road section have no intersection, obtaining a second environmental parameter set, where the second environmental parameter set is a set of environmental parameters of the automated driving system on the target road section, and determining, when it is identified that the second environmental parameter set and the third environmental parameter set have an intersection, that the automated driving system exceeds the ODD of the target road section.

This embodiment of the present disclosure provides the third environmental parameter set (for example, a vehicle is forbidden to run when a snowfall is greater than 9.9 mm on a road section). The second environmental parameter set is compared with the third environmental parameter set, and when the two sets have an intersection (that is, it indicates that some elements in the second environmental parameter set belong to the third environmental parameter set, for example, a snowfall 10 mm), it is determined that the automated driving system exceeds the ODD on the road section. The second environmental parameter set may be compared with a specific forbid parameter, to improve determining efficiency and accuracy of the vehicle.

In a possible implementation, the third environmental parameter set includes one or more preset third objects, and the second environmental parameter set includes one or more second objects, and determining, when it is identified that the second environmental parameter set and the third environmental parameter set have an intersection, that the automated driving system exceeds the ODD of the target road section includes, when it is identified that at least one second object in the second environmental parameter set is the same as any third object in the third environmental parameter set, determining that the automated driving system exceeds the ODD of the target road section. In this embodiment of the present disclosure, when a same object exists in two sets (for example, a pedestrian and a cyclist appear on a highway), it is determined that the automated driving system exceeds the ODD on the road section. A plurality of objects that should not appear are preset, to enrich the third environmental parameter set, and expand a determining range of the vehicle.

In a possible implementation, the method further includes, when the second object does not belong to the third environmental parameter set, and the second object does not belong to the first environmental parameter set (for example, unusual litters on a highway), sending information about the second object to a cloud platform, where the cloud platform determines whether the automated driving system exceeds the ODD of the target road section. In this embodiment of the present disclosure, when the vehicle cannot determine an object in third environmental parameters, the vehicle may determine the object by interacting with the cloud platform. A limitation of a data amount used by a vehicle-end database to store the third environmental parameter set is compensated, and first-time determining is performed by using the cloud platform, to improve a degree of running safety. Optionally, in this case, the autonomous vehicle may slow down, or the vehicle is controlled to stop running.

In a possible implementation, after the cloud platform determines whether the automated driving system exceeds the ODD of the target road section, the method includes, when the cloud platform determines that the automated driving system exceeds the ODD of the target road section, updating the third environmental parameter set, or when the cloud platform determines that the automated driving system does not exceed the ODD of the target road section, updating the first environmental parameter set. In this embodiment of the present disclosure, after the cloud platform performs determining, the vehicle end may update the stored third environmental parameter set or the first environmental parameter set, so that the vehicle can more efficiently perform identification and determining when data with a same feature is obtained next time. For example, if it is determined that the second object is within the ODD, the second object is added to the first environmental parameter set. If it is determined that the second object exceeds the ODD, the second object is added to the third environmental parameter set.

In a possible implementation, after it is determined that the automated driving system exceeds the ODD of the target road section, the method further includes reducing a speed of the vehicle, or requesting a driver of the vehicle to take over, or controlling the vehicle to stop running. In this embodiment of the present disclosure, the vehicle is controlled by stopping or slowing down, to perform a corresponding action after the vehicle exceeds the ODD, to ensure safe running of the vehicle.

According to a third aspect, an embodiment of the present disclosure provides an ODD determining apparatus, applied to an automated driving system of a vehicle. The apparatus includes an ODD determining unit configured to determine an ODD of a target road section where the automated driving system is located, where a first parameter set corresponding to the ODD includes a first environmental parameter set and/or a first operating parameter set of the automated driving system, a data obtaining unit configured to obtain a second parameter set, where the second parameter set includes a second environmental parameter set and/or a second operating parameter set, the second environmental parameter set is a set of environmental parameters of the automated driving system on the target road section, and the second operating parameter set is a set of operating parameters of the automated driving system on the target road section, and a first determining unit configured to, when it is identified that the second parameter set is a subset of the first parameter set, determine that the automated driving system does not exceed the ODD of the target road section.

In a possible implementation, the second parameter set includes the second environmental parameter set and the second operating parameter set, and the first parameter set includes the first environmental parameter set and the first operating parameter set. The first determining unit is further configured to, when it is identified that the second environmental parameter set is a subset of the first environmental parameter set and the second operating parameter set is a subset of the first operating parameter set, determine that the automated driving system does not exceed the ODD of the target road section.

In a possible implementation, the data obtaining unit is further configured to receive ODD indication information sent by a road side unit or a cloud platform, and determine the second parameter set based on the ODD indication information.

In a possible implementation, the data obtaining unit is further configured to obtain an element in the second parameter set and a value corresponding to the element by using a sensor of the vehicle, a road side unit, or a cloud platform, or obtain an element in the second parameter set by using a sensor of the vehicle, a road side unit, or a cloud platform.

In a possible implementation, the first operating parameter includes a speed of the vehicle.

In a possible implementation, the first parameter set corresponds to the target road section.

In a possible implementation, the first parameter set is a set stored in a database corresponding to the target road section.

In a possible implementation, the apparatus further includes a second determining unit configured to, when it is identified that the second environmental parameter set is not a subset of the first environmental parameter set or the second operating parameter set is not a subset of the first operating parameter set, determine that the automated driving system exceeds the ODD of the target road section.

In a possible implementation, the first environmental parameter set includes one or more preset first objects, and the second environmental parameter set includes one or more second objects. The second determining unit is further configured to, when it is identified that at least one second object in the second environmental parameter set is different from any first object in the first environmental parameter set, determine that the automated driving system exceeds the ODD of the target road section.

In a possible implementation, the first operating parameter set includes one or more first operating parameters and first value ranges corresponding to the one or more first operating parameters, and the second operating parameter set includes one or more second operating parameters and second values corresponding to the one or more second operating parameters. The second determining unit is further configured to, when the second operating parameter is the same as the first operating parameter, and it is identified that the second value is not within the first value range, determine that the automated driving system exceeds the ODD of the target road section.

In a possible implementation, the apparatus further includes a first control unit configured to, after it is determined that the automated driving system exceeds the ODD of the target road section, reduce the speed of the vehicle, or request a driver of the vehicle to take over, or control the vehicle to stop running.

According to a fourth aspect, an embodiment of the present disclosure provides an ODD determining apparatus, applied to an automated driving system of a vehicle. The apparatus includes an environmental parameter determining unit configured to determine a third environmental parameter set of a target road section where the automated driving system is located, where the third environmental parameter set and a first environmental parameter set in a first parameter set corresponding to an ODD of the target road section have no intersection, an environmental parameter obtaining unit configured to obtain a second environmental parameter set, where the second environmental parameter set is a set of environmental parameters of the automated driving system on the target road section, and a third determining unit configured to, when it is identified that the second environmental parameter set and the third environmental parameter set have an intersection, determine that the automated driving system exceeds the ODD of the target road section.

In a possible implementation, the third environmental parameter set includes one or more preset third objects, and the second environmental parameter set includes one or more second objects. The third determining unit is further configured to, when it is identified that at least one second object in the second environmental parameter set is the same as any third object in the third environmental parameter set, determine that the automated driving system exceeds the ODD of the target road section.

In a possible implementation, the apparatus further includes a cloud platform determining unit configured to, when the second object does not belong to the third environmental parameter set, and the second object does not belong to the first environmental parameter set, send information about the second object to a cloud platform, where the cloud platform determines whether the automated driving system exceeds the ODD of the target road section.

In a possible implementation, the apparatus further includes an update unit configured to, after the cloud platform determines whether the automated driving system exceeds the ODD of the target road section, when the cloud platform determines that the automated driving system exceeds the ODD of the target road section, update the third environmental parameter set, or when the cloud platform determines that the automated driving system does not exceed the ODD of the target road section, update the first environmental parameter set.

In a possible implementation, the apparatus further includes a second control unit configured to reduce a speed of the vehicle, or request a driver of the vehicle to take over, or control the vehicle to stop running.

According to a fifth aspect, this disclosure provides a terminal. The terminal includes a processor, and the processor is configured to support the terminal in performing a corresponding function in the ODD determining method provided in the first aspect or the second aspect. The terminal may further include a memory, and the memory is configured to be coupled to the processor and stores program instructions and data of the terminal. The terminal may further include a communications interface configured to perform communication between the terminal and another device or communications network.

According to a sixth aspect, this disclosure provides a chip system. The chip system may perform any method in the first aspect or the second aspect, so that a related function is implemented. In a possible design, the chip system further includes a memory. The memory is configured to store program instructions and data. The chip system may include a chip, or may include a chip and another discrete device.

According to a seventh aspect, this disclosure provides a computer-readable storage medium configured to store computer software instructions used by the ODD determining apparatus according to the third aspect or the fourth aspect. The computer software instructions may include a program designed for executing the foregoing aspects.

According to an eighth aspect, an embodiment of the present disclosure provides a computer program, the computer program may include instructions, and when the computer program is executed by a computer, the computer is enabled to perform the procedure in the ODD determining method according to the first aspect or the second aspect.

According to a ninth aspect, this disclosure provides a vehicle. The vehicle is equipped with the ODD determining apparatus according to the first aspect and a corresponding automated driving system, and may be configured to perform any method according to the first aspect or the second aspect, so that a related function is implemented.

According to a tenth aspect, this disclosure provides a server. The server includes a memory, and the memory stores executable program code. The server may further include a processor coupled to the memory, and the processor invokes the executable program code stored in the memory, to perform a corresponding function in the ODD determining method according to the first aspect or the second aspect.

According to an eleventh aspect, this disclosure provides a device. The device includes a processor, and the processor is configured to support the device in performing a corresponding function in the ODD determining method provided in the first aspect or the second aspect. The device may further include a memory, the memory is configured to be coupled to the processor, and the memory stores program instructions and data of the device. The device may further include a communications interface configured to perform communication between the device and another device or communications network.

BRIEF DESCRIPTION OF DRAWINGS

To describe the technical solutions in some of the embodiments of the present disclosure more clearly, the following briefly describes the accompanying drawings used to describe some of the embodiments.

DESCRIPTION OF EMBODIMENTS

Figure 1:
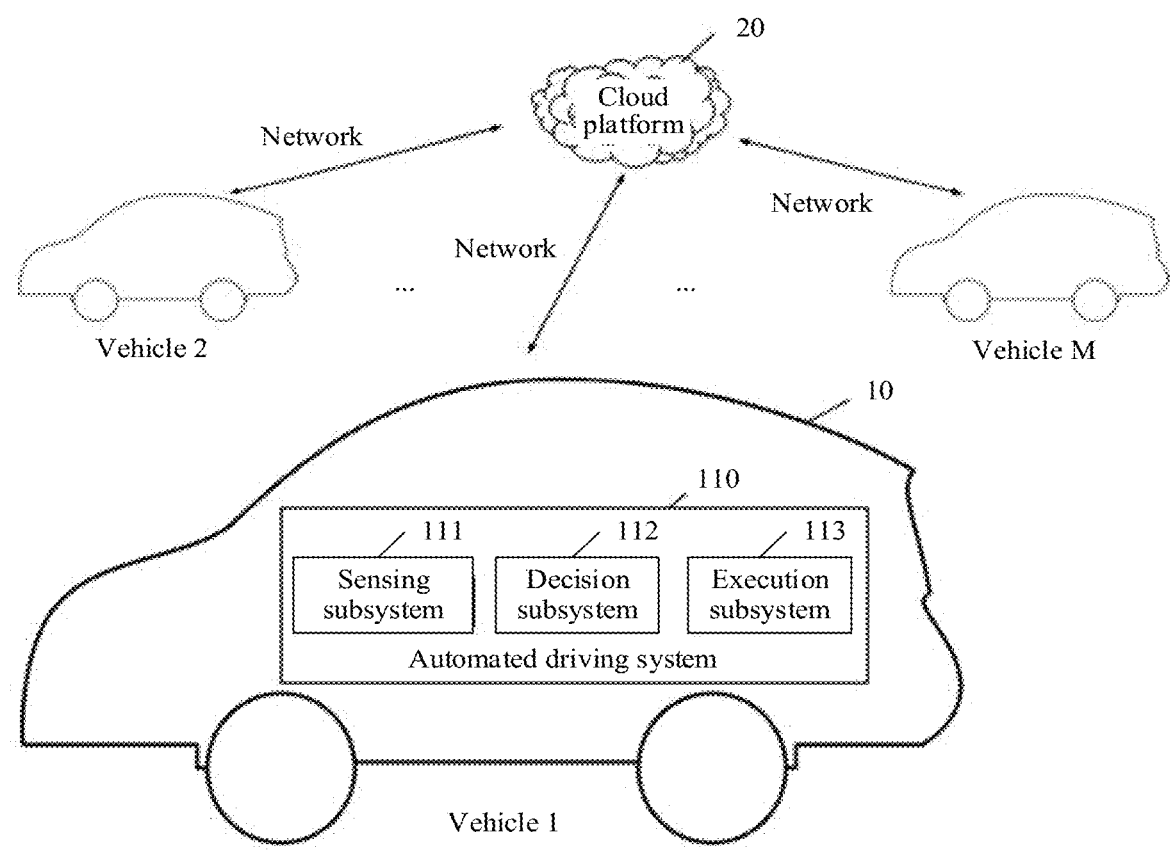
FIG. 1 is a schematic diagram of an ODD determining architecture according to an embodiment of the present disclosure.

The following describes the embodiments of the present disclosure with reference to the accompanying drawings in the embodiments of the present disclosure.

In the specification, claims, and accompanying drawings of this disclosure, the terms "first", "second", "third", "fourth", and the like are intended to distinguish between different objects but do not indicate a particular order. In addition, the terms "including", "having", and any other variant thereof are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

Mentioning an "embodiment" in this specification means that a particular characteristic, structure, or feature described with reference to the embodiment may be included in at least one embodiment of this disclosure. The phrase shown in various locations in this specification may not necessarily refer to a same embodiment, and is not an independent or optional embodiment exclusive from another embodiment. It is explicitly and implicitly understood by a person skilled in the art that the embodiments described in this specification may be combined with another embodiment.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in the figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

Some terms in this disclosure are first described, to help a person skilled in the art has better understanding.

(1) An ODD, or referred to as an operational design area or an operational design condition, is an operating condition under which an automated driving system or an automated driving feature is designed to operate, and commonly, is an operating condition of an automated driving function. For example, the operating condition may include but is not limited to environmental, geographic, and time-of-day restrictions, traffic or roadway characteristics, and an operating speed.

(2) An electronic control unit (ECU), or referred to as a "trip computer", "vehicle-mounted computer", and the like, is a vehicle-specific microcomputer controller. The ECU includes a microcontroller unit (MCU), a memory (for example, a read-only memory (ROM) and a random-access memory (RAM)), an input/output interface, an analog-to-digital converter, large-scale integrated circuits such as a shaper and a drive, and the like.

(3) The global navigation satellite system (GNSS) uses observed quantities such as pseudorange, ephemeris, and satellite launch time of a group of satellites for positioning, and also needs to know a user clock difference. The global navigation satellite system is an airborne radio navigation and positioning system that can provide a user with all-weather three-dimensional coordinates and speeds, and time information at any place of Earth's surface or near earth space. The system can accurately position longitude, latitude, and altitude based on four satellites.

(4) A human machine interface (HMI), also referred to as a user interface, is a medium for interaction and information exchange between a system and a user, and implements conversion between an internal form of information and a form acceptable to human beings.

(5) Vehicle-to-everything (V2X) is a key technology of an intelligent transport system, and enables communication between vehicles, a vehicle and a base station, a vehicle and a road side unit, a vehicle and a cloud, a vehicle and a pedestrian, and the like. Therefore, a series of traffic information such as real-time road conditions, road information, and pedestrian information are obtained. With a V2X system, an automated driving system can obtain more real-time data, which may be used for real-time traffic information analysis and optimal route selection, and may also provide important inputs for determining an ODD of the automated driving system. For example, a vehicle receives related information released by traffic and meteorology authoritative departments, or related authoritative V2X information released by an original equipment manufacturer (OEM) to a vehicle of the OEM, to assist in determining an ODD.

(6) A road side unit (RSU) is an apparatus that is installed on the roadside and communicates with an on-board unit (OBU) by using a short-range communications technology (for example, a cellular-V2X technology).

(7) A dynamic driving task is sensing, decision, and execution used for completing vehicle driving. That is, the dynamic driving tasks include all real-time operational and tactical functions used to operate a vehicle in on-road traffic and excludes a strategic function such as trip scheduling and selection of destinations and routes. For example, the dynamic driving tasks include but is not limited to the following subtasks: lateral vehicle motion control, longitudinal vehicle motion control, monitoring a driving environment via object and event detection, recognition, and classification, response preparation, response execution, driving decision, vehicle lighting control, and signal apparatus control.

(8) Driving automation levels: Level 1 driving automation (driver assistance): A driving automation system performs sustained lateral or longitudinal vehicle motion control in a dynamic driving task within an ODD, and has an object and event detection and response capability appropriate to the performed lateral or longitudinal vehicle motion control. Level 2 driving automation (partial driving automation): The driving automation system performs sustained lateral and longitudinal vehicle motion control in a dynamic driving task within an ODD, and has an object and event detection and response capability appropriate to the performed lateral and longitudinal motion control. In the Level 2 driving automation, a driver executes remaining dynamic driving tasks, monitor a behavior of the system, and perform appropriate responses or operations. Level 3 driving automation (conditional driving automation): The driving automation system continuously executes an entire dynamic driving task within an ODD. In the Level 3 driving automation, a dynamic driving task fallback-ready user does not need to monitor a behavior of the system. However, when the system issues an intervention request or a dynamic driving task performance-relevant system failure occurs, the dynamic driving task fallback-ready user takes over a vehicle in an appropriate manner to achieve a minimal risk condition. Level 4 driving automation (high driving automation): The driving automation system continuously executes an entire dynamic driving task and dynamic driving task fallback within an ODD. In the Level 4 driving automation, an in-vehicle user, as a passenger, does not need to monitor a behavior of the system and does not respond to an intervention request sent by the driving automation system. The system can automatically achieve a minimal risk condition. Level 5 driving automation (full driving automation): The driving automation system continuously executes an entire dynamic driving task and dynamic driving task fallback under any driving conditions.

(9) A GPU, also referred to as a display core, a visual processor, or a display chip, is a microprocessor performing image and graphics-related operations on a personal computer, a workstation, a game machine, and some mobile devices (such as a tablet computer and a smartphone).

The following describes an ODD determining architecture according to the embodiments of the present disclosure. FIG. 1 is a schematic diagram of an ODD determining architecture according to an embodiment of the present disclosure. As shown in FIG. 1, the ODD determining architecture may mainly include two parts: an automated driving system of a vehicle 10 (namely, a vehicle 1), a vehicle 2, and a vehicle M (M is an integer greater than 0, a quantity of vehicles shown in the figure is an example for description, and a cloud platform usually establishes communication to a plurality of vehicles), and a cloud platform 20 (namely, a cloud device). The cloud device may provide some information for the automated driving system 110 of the vehicle 10, and assist the automated driving system of the vehicle in determining an ODD. The automated driving system 110 may include the following three subsystems: a sensing subsystem 111, a decision subsystem 112, and an execution subsystem 113.

The sensing subsystem 111 may include at least a sensor. Further, the sensor may include an internal sensor and an external sensor. The internal sensor is configured to monitor a condition of the vehicle, and may include at least one of a speed sensor, an acceleration sensor, an angular velocity sensor, and the like. The external sensor is mainly configured to monitor an external environment around the vehicle, and for example, may include a video sensor and a radar sensor. The video sensor is configured to obtain and monitor image data of the environment of the vehicle. The radar sensor is configured to obtain and monitor electromagnetic wave data in the environment of the vehicle, and mainly detect data such as a distance between a surrounding object and the vehicle and a shape of the surrounding object by transmitting an electromagnetic wave and then receiving an electromagnetic wave reflected by the surrounding object.

For example, a plurality of radar sensors is distributed throughout the exterior of the vehicle 10. A subset of the plurality of radar sensors is coupled to the front of the vehicle 10, to position an object in front of the vehicle 10. One or more other radar sensors may be located at the rear of the vehicle 10, to position an object behind the vehicle 10 when the vehicle 10 is reversing. Other radar sensors may be located on the side of the vehicle 10, to position an object such as another vehicle 10 approaching the vehicle 10 from the side. For example, a light detection and ranging (LIDAR) sensor may be mounted on the vehicle 10. For example, the LIDAR sensor is mounted in a rotating structure on the vehicle 10. The LIDAR sensor 120 is then rotated to transmit light signals around the vehicle 10 in a 360 degrees (°) mode, to continuously map all objects around the vehicle 10 as the vehicle 10 moves.

For example, an imaging sensor such as a camera, a video camera, or other similar image capture sensor may be mounted on the vehicle 10 to capture images as the vehicle 10 moves. A plurality of imaging sensors may be mounted on all sides of the vehicle 10 to capture images around the vehicle 10 in a 360° mode. The imaging sensor captures not only visible spectrum images, but also infrared spectrum images.

For example, a Global Positioning System (GPS) sensor may be located on the vehicle 10 to provide a controller with geographical coordinates and coordinates generation time regarding a location of the vehicle 10. The GPS includes both an antenna for receiving GPS satellite signals and a GPS receiver coupled to the antenna. For example, when an object is observed in an image or by another sensor, the GPS may provide the geographical coordinates and time of the discovery.

The decision subsystem 112 may include at least an electronic control unit ECU (including a first ECU and a second ECU), a map database, and an object database. Optionally, the decision subsystem 112 may further include a communications unit. The ECU is a computing device configured to control the automated driving system. An automated driving ECU performs a decision control function of the automated driving system. For example, the automated driving ECU is connected to a bus, and communicates with another device through the bus. For example, the ECU may obtain information transferred by internal and external sensors, the map database, and an HMI, and output corresponding information to the HMI and an actuator. For example, the ECU loads a program stored in a ROM to a RAM, and a central processing unit (CPU) runs the program in the RAM to implement an automated driving function. The automated driving ECU may include a plurality of ECUs. The ECU may recognize a static and/or dynamic target around the vehicle, for example, obtain a target monitoring result based on an external sensor. The ECU may monitor attributes such as a speed and a direction of a surrounding target. The ECU may obtain condition information of the vehicle and output information based on the internal sensor. Based on the information, the ECU plans a driving route and outputs a corresponding control signal to the actuator, and the actuator executes corresponding lateral and longitudinal motion.

In the embodiments of the present disclosure, the ECU may include an ECU 1 (an automated driving ECU is used as an example, that is, the first ECU) and an ECU 2 (an ODD determining ECU is used as an example, that is, the second ECU). The ECU 2 may include a vehicle positioning unit, an object obtaining and calculating unit, and a determining unit.

The vehicle positioning unit is configured to estimate a vehicle location. The vehicle positioning unit may estimate the vehicle location in a same method as the ECU 1 in the automated driving system, or the vehicle positioning unit directly obtains location estimation information of the vehicle from the automated driving ECU.

The object obtaining and calculating unit is configured to obtain map information such as object information associated with a geographic location from the map database. The object obtaining and calculating unit may also obtain specific content information of an object from the object database. In addition, the obtaining and calculating unit may obtain sensor information from a sensor, and compare an object obtained from the sensor information with an object in the object database based on, for example, an image recognition technology or another technology.

The determining unit is configured to determine, based on a determining result of the object obtaining and calculating unit, whether the object is within an ODD.

Figure 2:
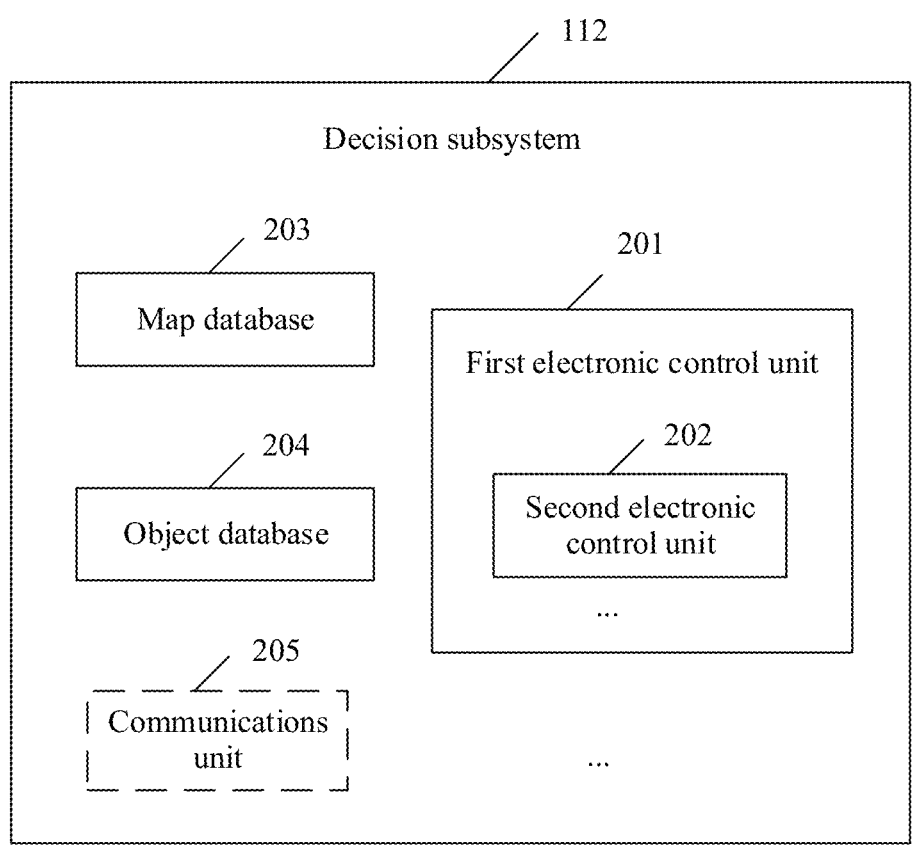
FIG. 2 is a schematic diagram of a structure of a decision subsystem according to an embodiment of the present disclosure.

Optionally, the ECU 1 may include the ECU 2. FIG. 2 is a schematic diagram of a structure of the decision subsystem according to an embodiment of the present disclosure. As shown in FIG. 2, the decision subsystem 112 may include a map database 203, an object database 204, and a first ECU (ECU 1) 201, and optionally, may further include a communications unit 205. The first ECU 201 is an automated driving ECU (belonging to an electronic control unit ECU). The first ECU 201 may include a plurality of ECUs (there may be a plurality of ECUs other than the ECU 2), and is configured to control the automated driving system to execute a decision control function of the automated driving system.

As shown in FIG. 2, the first ECU 201 may include a second ECU (ECU 2) 202, and the second ECU 202 (namely, the ECU 2) is configured to determine an ODD of the automated driving system. For example, the first ECU exchanges information with the map database through a communications network. That is, the second ECU 202 may obtain map information in the map database.

The communications unit is configured to perform V2X communication, for example, may exchange data with a surrounding vehicle, a roadside communications device, or a cloud server. For example, a radio coupled to an antenna may be located in the vehicle 10 to provide wireless communication for the system. The radio is used to operate any wireless communications technology or wireless standard, including but not limited to WI-FI (The Institute of Electrical and Electronics Engineers (IEEE) 802.11) and cellular (for example, one or more of a Global System for Mobile Communications (GSM), code-division multiple access (CDMA), Time-Division multiple access (TDMA), Long-Term Evolution (LTE), and New Radio). The radio may include a plurality of radios, so that a controller may communicate over wireless channels using a plurality of radio technologies.

The object database may store content information or feature information corresponding to an object, for example, content of a traffic sign and a traffic marking. It should be noted that the object database may be included in the map database and may not necessarily exist separately.

The map database is used to store map information. Optionally, a hard disk drive (HDD) may be used as a data storage device of the map database. It may be understood that the map database may include various location information, for example, a connection relationship between roads, a location of a lane line, a quantity of lane lines, other objects around a road, traffic sign information (for example, a location and a height of a traffic light, and content of signs such as a speed limit sign, a winding road sign, and a slow sign), and information about trees and buildings around a road. The foregoing information is all associated with a geographic location. In addition, the map information may also be used for positioning, and is used in combination with sensor data. Optionally, the stored map information may be two-dimensional information, or may be three-dimensional information.

Figure 3:
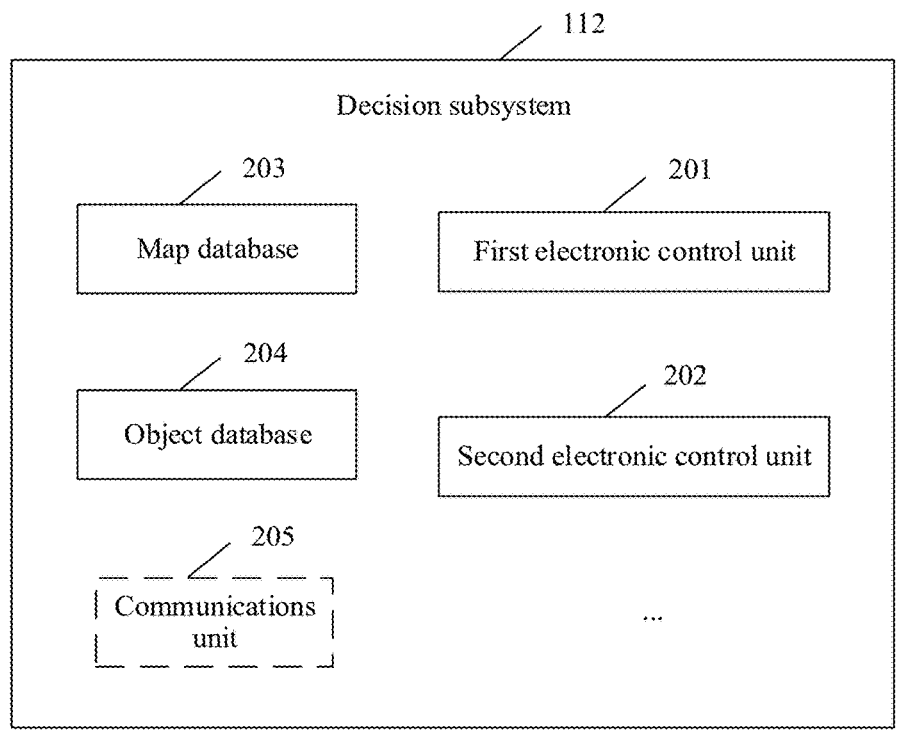
FIG. 3 is another schematic diagram of a structure of a decision subsystem according to an embodiment of the present disclosure.

Optionally, the ECU 1 and the ECU 2 are independent ECUs. FIG. 3 is another schematic diagram of a structure of the decision subsystem according to an embodiment of the present disclosure. As shown in FIG. 3, the decision subsystem 112 may include a map database 203, an object database 204, a first ECU 201, and a second ECU 202, and optionally, may further include a communications unit 205. The second ECU is independent of the first ECU. That is, the first ECU does not include the second ECU. The structure shown in the figure is an example for description. A structure and content of the decision subsystem include but are not limited to the foregoing content and structure.

The execution subsystem 113 may include at least an actuator configured to control lateral and/or longitudinal vehicle motion. For example, a brake actuator controls a braking system and braking force based on a control signal received from the automated driving ECU. A steering actuator controls a steering system based on a control signal from the automated driving ECU. Optionally, the steering system may be an electronic steering system or a mechanical steering system.

It should be noted that elements of the systems in FIG. 1 to FIG. 3 are for illustrative purposes only, and other systems including more or fewer components may be configured to perform any method disclosed in this disclosure.

Figure 4:
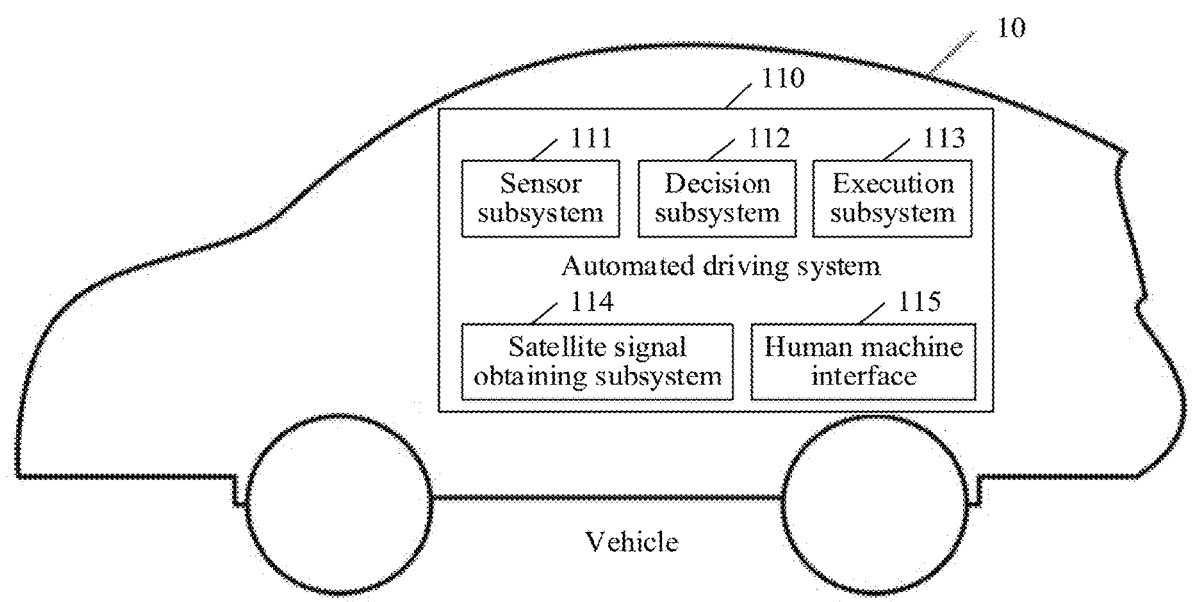
FIG. 4 is a schematic diagram of an automated driving system of a vehicle according to an embodiment of the present disclosure.

FIG. 4 is a schematic diagram of an automated driving system of a vehicle according to an embodiment of the present disclosure. As shown in FIG. 4, the automated driving system may further include a GNSS signal obtaining subsystem (namely, a satellite signal obtaining subsystem) 114 and a human machine interface 115. The HMI 115 is configured to exchange information with the automated driving system. For example, the HMI may be connected to a display and a voice device, and information is intuitively provided for a user in a manner such as displaying an image on the display or performing a sound prompt by using the voice device. In addition, the user may provide information for the automated driving system installed on the vehicle by performing an operation on the display, by using a voice, or the like. For example, an ECU may obtain information from the GNSS signal obtaining subsystem, information from the map database, and sensor information to estimate a vehicle location.

It should be noted that the automated driving system includes L1 to L5 driving automation systems, may assist a driver or fully control the vehicle without any driver intervention. The vehicle includes an internal combustion engine, an electric motor, or both to provide locomotive power. A driving capability may be completed by a mechanical transmission device and a linkage assisted by a servo system or completed by servo control controlled by a controller.

Figure 5:
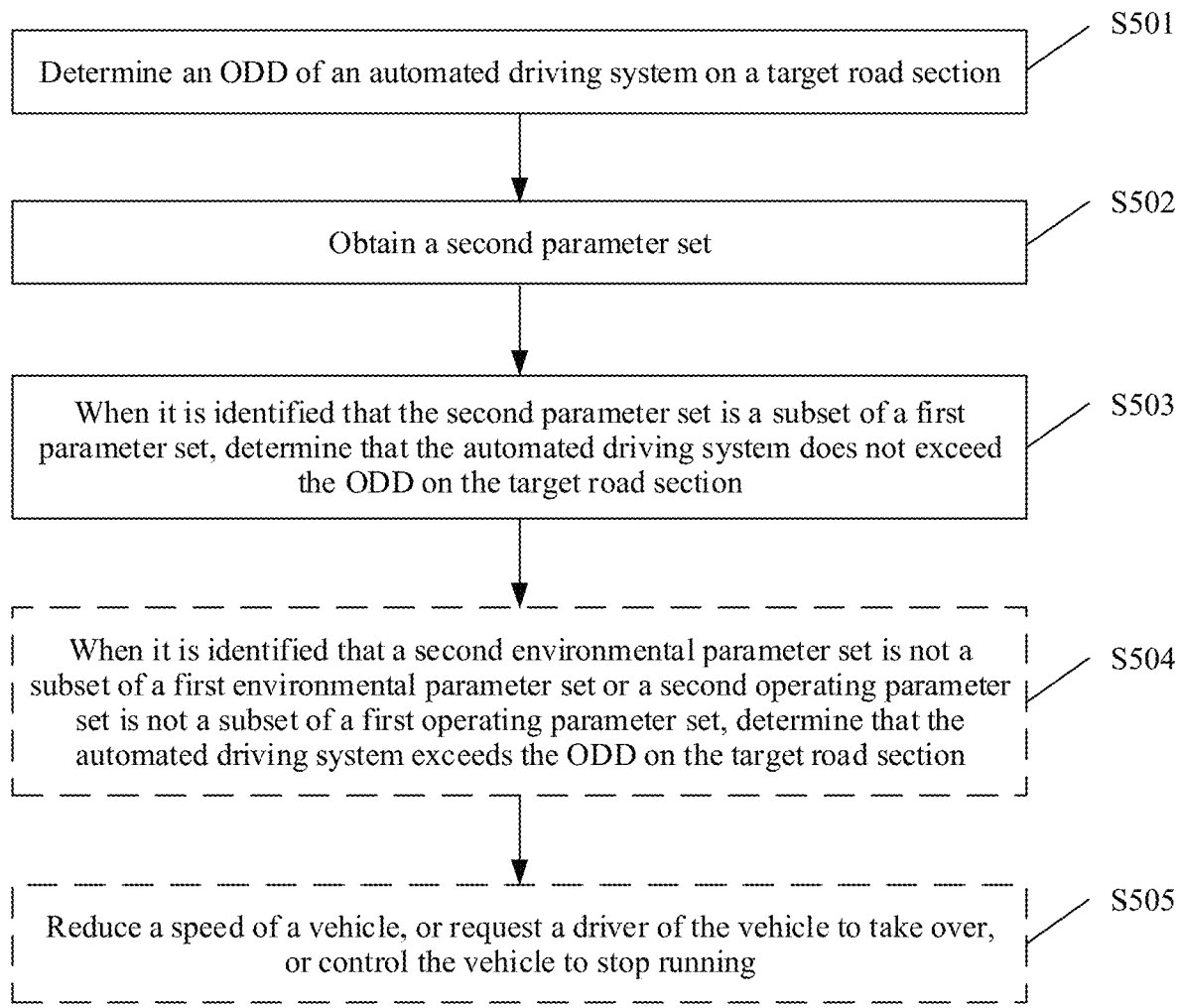
FIG. 5 is a schematic flowchart of an ODD determining method according to an embodiment of the present disclosure.

With reference to the foregoing ODD determining architecture, the following describes an ODD determining method provided in an embodiment of the present disclosure. FIG. 5 is a schematic flowchart of an ODD determining method according to an embodiment of the present disclosure. The method is performed by the ECU 2, and may include step S501 to step S505. Optional steps may include step S504 and step S505.

Step S501: Determine an ODD of an automated driving system on a target road section.

Further, the ODD of an automated driving system of a vehicle on the target road section is determined. A first parameter set corresponding to the ODD includes a first environmental parameter set and/or a first operating parameter set of the automated driving system. The first environmental parameter set is a set of environmental parameters used for normal operating of the automated driving system on the target road section. The first operating parameter set is a set of operating parameters used for normal operating of the vehicle/automated driving system on the target road section. For example, the first environmental parameter set includes a light intensity greater than 1000 lx, a road width greater than 5 meters, a lane line, a pedestrian, and a cyclist. The first operating parameter set corresponding to the target road section includes a speed less than 100 km/h. Optionally, a geographic location of the vehicle is determined based on a vehicle-mounted GPS. Optionally, the first operating parameter set corresponding to the target road section is usually associated with the first environmental parameter set corresponding to the target road section. To be specific, the first operating parameter set is usually a parameter set obtained in premise in which first environmental parameters are met. For example, the vehicle may run at different speeds under different light intensities. The target road section may be a current road section, or may be a next road section. The target road section is a stretch of road that includes a start point and an end point. Optionally, the current ODD of the target road section where the automated driving system is located may be determined based on positioning of the vehicle.

Optionally, the first parameter set corresponding to the ODD includes the preset first environmental parameter set, and an obtained parameter set may include a second environmental parameter set and a second operating parameter set, or a second environmental parameter set. It may be understood that when the first parameter set includes the first environmental parameter set, the obtained set includes at least the second environmental parameter set corresponding to the first environmental parameter set.

Optionally, the first parameter set corresponding to the ODD includes the preset first operating parameter set, and an obtained parameter set may include a second environmental parameter set and a second operating parameter set, or a second operating parameter set. It may be understood that when the first parameter set includes the first operating parameter set, the obtained set includes at least the second operating parameter set corresponding to the first operating parameter set.

Optionally, the first parameter set corresponding to the ODD includes the preset first environmental parameter set and the first operating parameter set, and an obtained set may include a second environmental parameter set and a second operating parameter set, or a second environmental parameter set, or a second operating parameter set. It may be understood that, when the first parameter set includes the first operating parameter set and the first environmental parameter set, the obtained set includes at least the second operating parameter set corresponding to the first operating parameter set or the second environmental parameter set corresponding to the first environmental parameter set, or includes the second operating parameter set and the second environmental parameter set.

It should be noted that preset content of the first parameter set and actual content of the obtained second parameter set are not limited in this embodiment of the present disclosure.

Step S502: Obtain the second parameter set.

Further, the second parameter set is obtained by using a sensor (including an internal sensor and an external sensor) mounted on the vehicle. For example, a temperature sensor (namely, an internal sensor) obtains a temperature of an engine of the vehicle in real time, to detect an operating condition of the engine. A ranging sensor (namely, an external sensor) detects a distance between the vehicle and an external object. The second parameter set includes the second environmental parameter set and/or the second operating parameter set, the second environmental parameter set is a set of environmental parameters of the automated driving system on the target road section, and the second operating parameter set is a set of operating parameters of the automated driving system on the target road section. For content of the second parameter set, refer to related descriptions in step S501. Details are not described herein again.

In a possible implementation, obtaining the second parameter set includes obtaining an element in the second parameter set and a value corresponding to the element by using a sensor of the vehicle, a road side unit, or a cloud platform (for example, a speed limit sign on the roadside is obtained by using a sensor, and the speed limit sign requires a speed less than or equal to 60 km/h), or obtaining an element (a pedestrian or a cyclist) in the second parameter set by using a sensor of the vehicle, a road side unit, or a cloud platform. For example, a sensor installed on the road side unit detects information about an object such as a pedestrian on the road, and sends the information to the automated driving system.

In a possible implementation, the first operating parameter includes a speed of the vehicle.

In a possible implementation, the first parameter set corresponds to the target road section.

In a possible implementation, the first parameter set is a set stored in a database corresponding to the target road section. For example, the automated driving system obtains, from a map database, the first parameter set (for example, a speed on the target road section is greater than a value) associated with the target road section.

Figure 6:
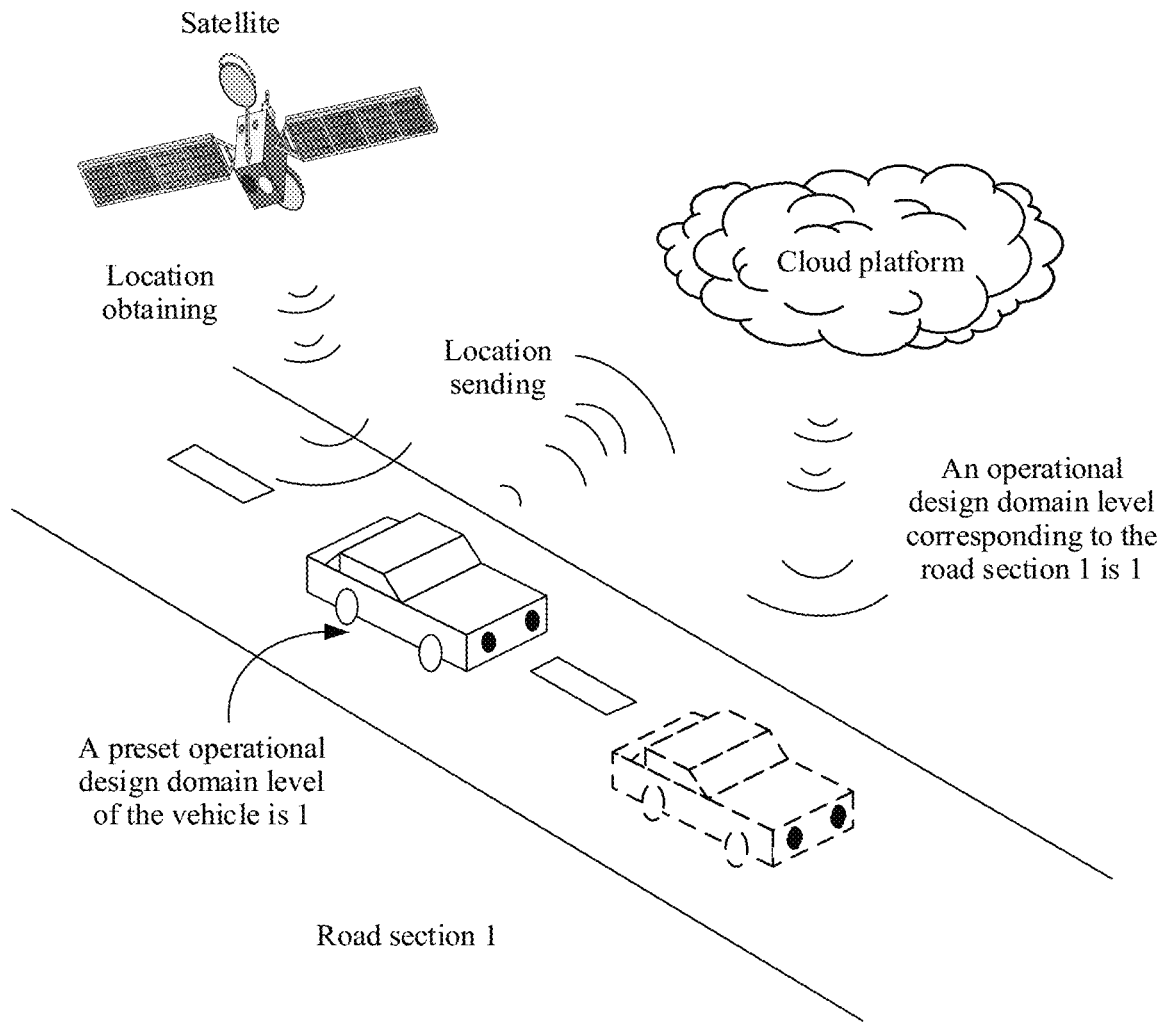
FIG. 6 is a schematic diagram of a method for determining an ODD of an automated driving system on a target road section according to an embodiment of the present disclosure.

In a possible implementation, obtaining a second parameter set includes receiving ODD indication information sent by the road side unit or the cloud platform, and determining the second parameter set based on the ODD indication information. FIG. 6 is a schematic diagram of a method for determining the ODD of the target road section where the automated driving system is located according to an embodiment of the present disclosure. As shown in FIG. 6, an example in which the cloud platform feeds back an ODD level (namely, the ODD indication information) is used. Specific steps are as follows.

Step 1: An ECU (namely, the ECU 2) obtains location information (that is, location obtaining in the figure) of the vehicle by receiving a satellite positioning signal (for example, a GNSS signal) from a satellite. It should be noted that step 1 is optional.

Step 2: Send the location information (that is, a road section 1) of the vehicle to the cloud platform (positioning sending shown in FIG. 6). It should be noted that step 2 is optional.

Step 3: Receive ODD level information sent by the cloud platform, where the ODD level information is related to the target road section.

Optionally, the ODD level information is related to the target road section, and the road section is a road section determined based on the location information of the vehicle.

It should be noted that the road side unit or the cloud platform may periodically deliver the ODD level information of the road section. Optionally, the ODD level information corresponds to a road section. For example, the ODD level information includes a start location and an end location of the road section. Alternatively, the ODD level information has a specific action range, and the action range may be determined based on radius information carried in the information.

Further, the ODD level information may include an ODD level (such as an ODD level 1, an ODD level 2, or an ODD level 3). For example, the cloud platform feeds back the ODD level 1 of the road section to the autonomous vehicle. In addition, the ODD level information may further include a correspondence between the ODD level information and an environmental parameter on the road section, a correspondence between the ODD level information and a vehicle operating parameter on the road section, and a correspondence between the ODD level information and an environmental parameter and an operating parameter on the road section. For details, refer to Table 1.

TABLE 1

| ODD level information | ODD level 1 | ODD level 2 | ODD level 3 | ODD level 4 |
|---|---|---|---|---|
| Road information | First-class road | Second-class road | Second-class road | Third-class road |
| Traffic environment information | Pedestrian and two-wheeler access restriction | Pedestrian access restriction | Separation of pedestrians and vehicles | Mixed traffic of pedestrians and vehicles |

As shown in Table 1, the road information and the traffic environment information in Table 1 are environmental parameters on a road section. The road information includes the first-class road, the second-class road, and the third-class road, and the traffic environment information includes the separation of pedestrians and vehicles, the mixed traffic of pedestrians and vehicles, the pedestrian access restriction, and the like. The ODD level 3 corresponds to the second-class road and the separation of pedestrians and vehicles. For example, the cloud platform not only feeds back the ODD level 1 to the automated driving system, but also feeds back a correspondence between an ODD level and an environmental and/or operating parameter. A specific form of the correspondence may include but is not limited to a table. It may be understood that the vehicle/automated driving system, the cloud platform, the road side unit, and the like have a unified meaning for the ODD. For example, information parsed by the vehicle for the ODD level 1 is consistent with information parsed by the cloud platform for the ODD level 1.

It should be noted that the correspondence between the ODD level information and an environmental parameter on the road section, the correspondence between the ODD level information and a vehicle operating parameter on the road section, and the correspondence between the ODD level information and an environmental parameter and an operating parameter on the road section may also be preconfigured on the vehicle.

Step 4: Determine, based on the ODD level information, an element in a second parameter set corresponding to the automated driving system on a current road section.

Further, when the ODD level information is an ODD level, the ODD level is matched with an ODD level stored in a database, and then a corresponding automated driving system operating parameter or environmental parameter (an element in the second parameter set) is found based on a correspondence between the ODD level and the ODD level stored in the database. Alternatively, when the ODD level information is an ODD level and a correspondence between the ODD level and various types of parameters (for example, an environmental parameter), a stored corresponding operating parameter or an environmental parameter (an element in the second parameter set) is directly found based on the correspondence.

It may be understood that the ODD level information may correspond to only some parameters in the second parameter set, and other parameters may be obtained by using a sensor system in the automated driving system.

Step 5: Determine whether the automated driving system is within a preset ODD.

Further, when the automated driving system is within the ODD, the vehicle continues to execute a dynamic driving task. Alternatively, when the automated driving system exceeds the preset operating condition (namely, the ODD), the vehicle immediately stops a dynamic driving task.

Optionally, the vehicle may further communicate with the road side unit by using V2X. Further, the cloud platform or the road side unit may send non-static (for example, semi-dynamic) information to the vehicle, for example, a weather condition (for example, rain, snow, or fog), a road-level dynamic element (for example, traffic control, a construction status, and information about pedestrians and bicycles crossing, where it may be understood that information such as pedestrian crossing may be a probability event obtained through probability statistics, for example, the cloud platform predicts that a probability of pedestrian crossing is 70% to 80% at about 5:00 pm), or a lane-level dynamic element (for example, a congestion status, a traffic accident, a wet/damaged road). A weather factor is used as an example. On a current road section, ODD level information indicates that a rainfall at the location is between 10 mm and 20 mm.

The operating parameters of the vehicle (the operating parameters may include requirements for a sensing capability, a computing capability, and a storage capability of the automated driving system of the vehicle) are used as an example. When the cloud platform identifies that the vehicle currently runs at an intersection, the cloud platform sends ODD level information of the intersection to the vehicle. The ODD level information of the intersection indicates that an automated driving system running at the intersection needs to have an omnidirectional sensing capability, and has a relatively strong computing capability (for example, a computing power of a GPU is greater than 10 TOPS). In addition, a storage capability of the automated driving system may be required. For example, a remaining storage capacity is required to be greater than 10 terabytes (TB).

Step S503: When it is identified that the second parameter set is a subset of the first parameter set, determine that the automated driving system does not exceed the ODD of the target road section.

Further, when the first parameter set includes a plurality of first parameter subsets, and the second parameter set is any subset of the plurality of first parameter subsets, it is determined that the automated driving system does not exceed the ODD on the current road section (namely, the target road section). Optionally, when the current road section has only one first parameter set, elements (which may further include a value of an element) in the second parameter set are some or all elements of the first parameter set, and it is determined that the automated driving system does not exceed the ODD on the road section.

Figure 7:
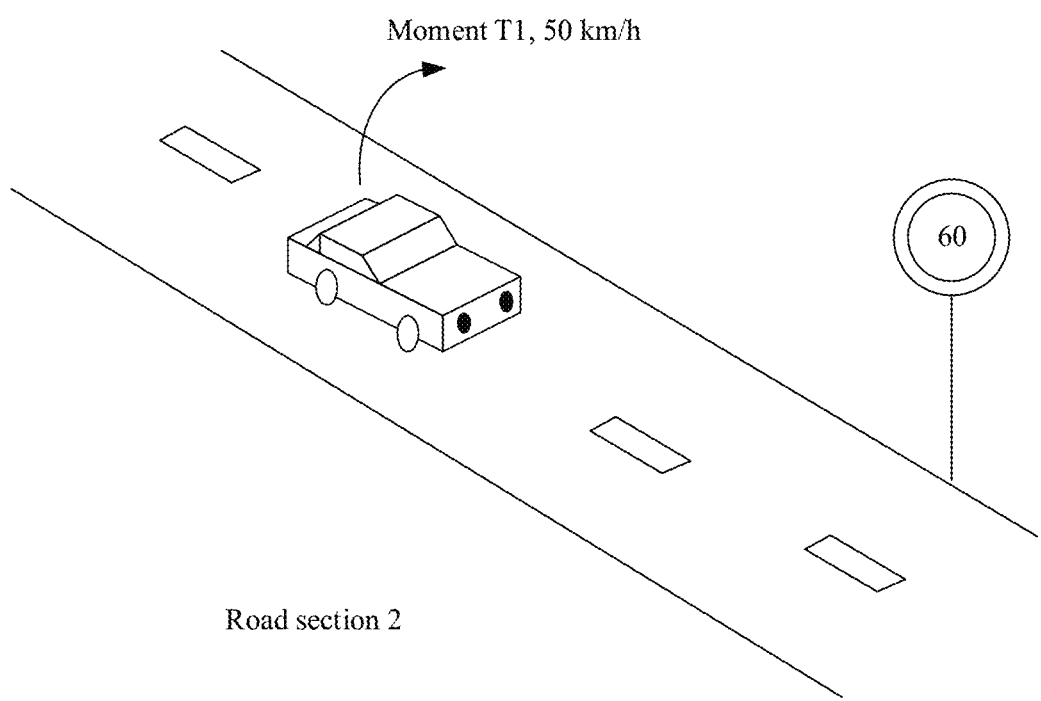
FIG. 7 is a schematic diagram of a scenario in which it is determined that an ODD is not exceeded according to an embodiment of the present disclosure.

For example, FIG. 7 is a schematic diagram of a scenario in which it is determined that the ODD is not exceeded according to an embodiment of the present disclosure. As shown in FIG. 7, a speed limit on a road section 2 is 60 km/h. At this moment (namely, a moment T1), the vehicle is running at 50 km/h. The vehicle reads a preset ODD on the road section with reference to positioning of the vehicle, and determines that a maximum speed of the vehicle in the ODD on the current section 1 is 55 km/h. The automated driving system determines that the automated driving system is within the ODD on the road section.

Figure 8:
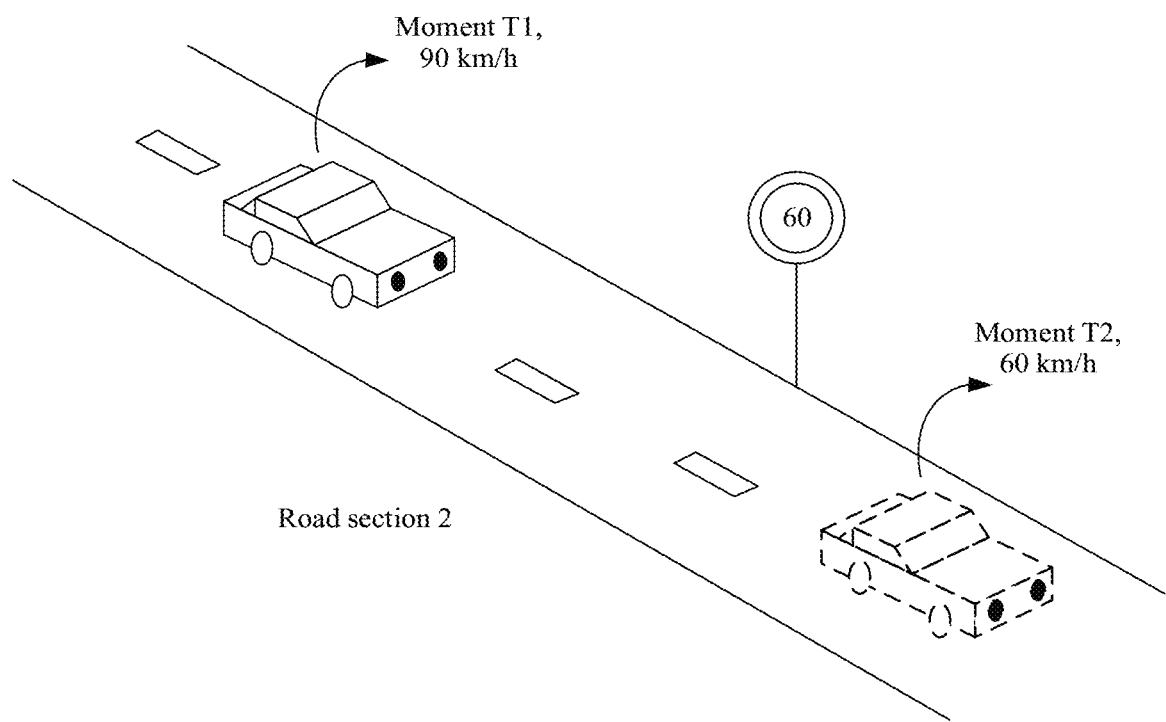
FIG. 8 is another schematic diagram of a scenario in which it is determined that an ODD is not exceeded according to an embodiment of the present disclosure.

For another example, FIG. 8 is another schematic diagram of a scenario in which it is determined that the ODD is not exceeded according to an embodiment of the present disclosure. As shown in FIG. 8, a speed limit sign 60 (namely, object information) is on the roadside of a road section 2. At a moment T1, the automated driving system of the vehicle captures the speed limit sign 60 on the roadside by using an image sensor such as a vehicle-mounted camera, and successfully recognizes the speed limit sign. Then, the vehicle reads a preset ODD (for example, a roadside sign is allowed) on the road section with reference to positioning of the vehicle, and determines that the speed limit sign is allowed on the current road section 1, and the automated driving system determines that the automated driving system is within the ODD on the road section.

Figure 9:
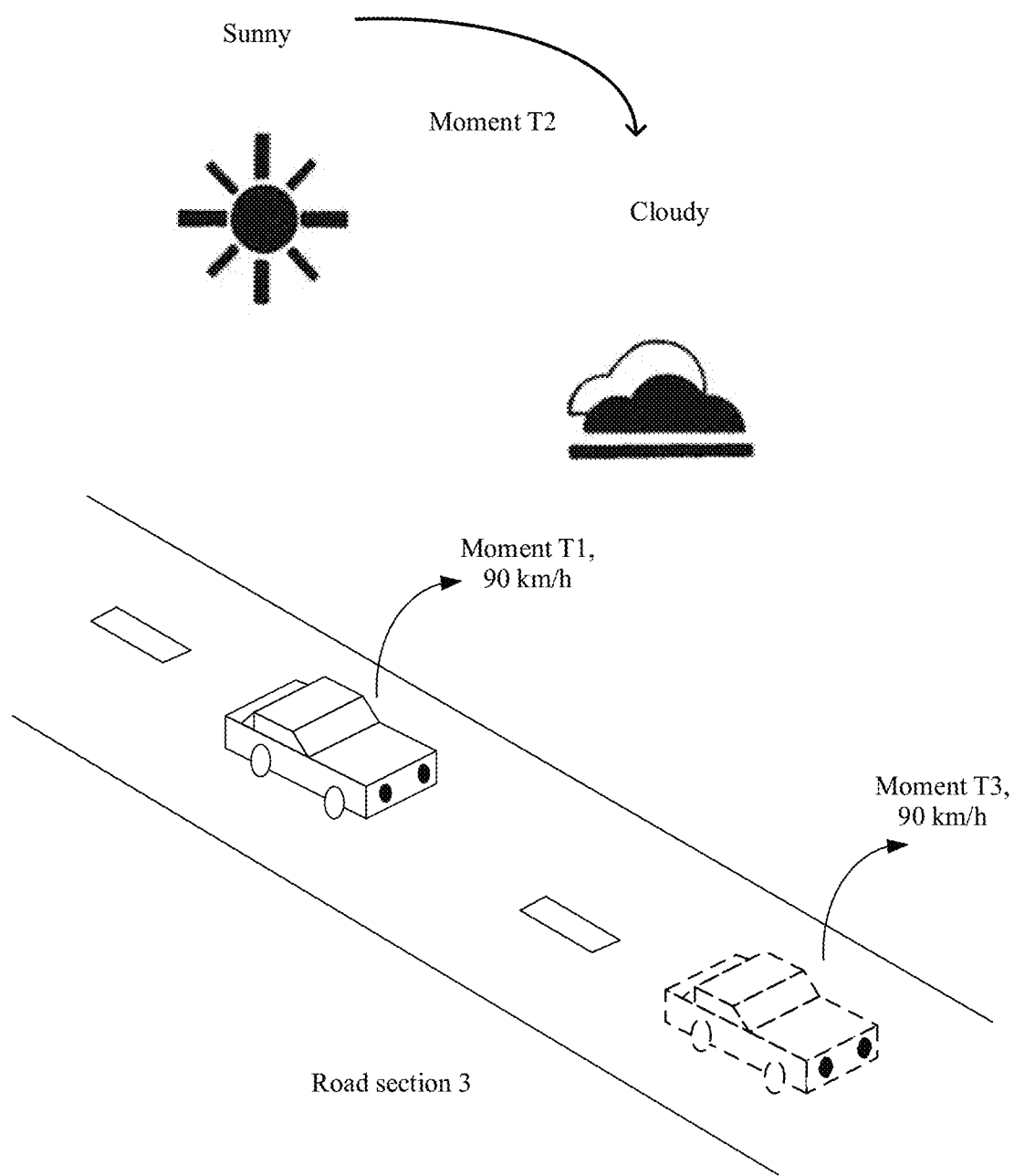
FIG. 9 is still another schematic diagram of a scenario in which it is determined that an ODD is not exceeded according to an embodiment of the present disclosure.

For example, FIG. 9 is still another schematic diagram of a scenario in which it is determined that the ODD is not exceeded according to an embodiment of the present disclosure.

As shown in FIG. 9, an example in which the second parameter set includes weather information (namely, dynamic information in the environmental parameters), and only a database of a vehicle end (namely, the vehicle) performs determining is used. At a moment T1, a vehicle running on a road section 3 executes an automated driving task, and a vehicle speed is 90 km/h. When weather information received at a moment T2 changes from sunny to cloudy, the vehicle end determines whether a result "cloudy" of the changed information exceeds an ODD on the current road section 3, that is, whether the vehicle can be allowed to execute a driving task in a cloudy day on the current road section. Assuming that an environmental parameter set of the ODD on the road section 3 includes a parameter of a cloudy day, it is determined that the ODD on the road section is not exceeded. As shown in the figure, at a moment T3, the vehicle continues to run (for example, a vehicle speed is not changed and is still 90 km/h). Optionally, the vehicle may not only perform determining based on the received weather information, but also determine feature data of a sunny day and a cloudy day in a time period between T1 and T3 by using data obtained by a sensor, to identify that it is cloudy currently (for example, it is determined, based on the light intensity lower than a threshold, that it is cloudy). Then, it is determined, based on the identification result (that is, it is cloudy), whether the vehicle exceeds the ODD. For subsequent descriptions, refer to the foregoing descriptions. Details are not described herein again.

Figure 10:
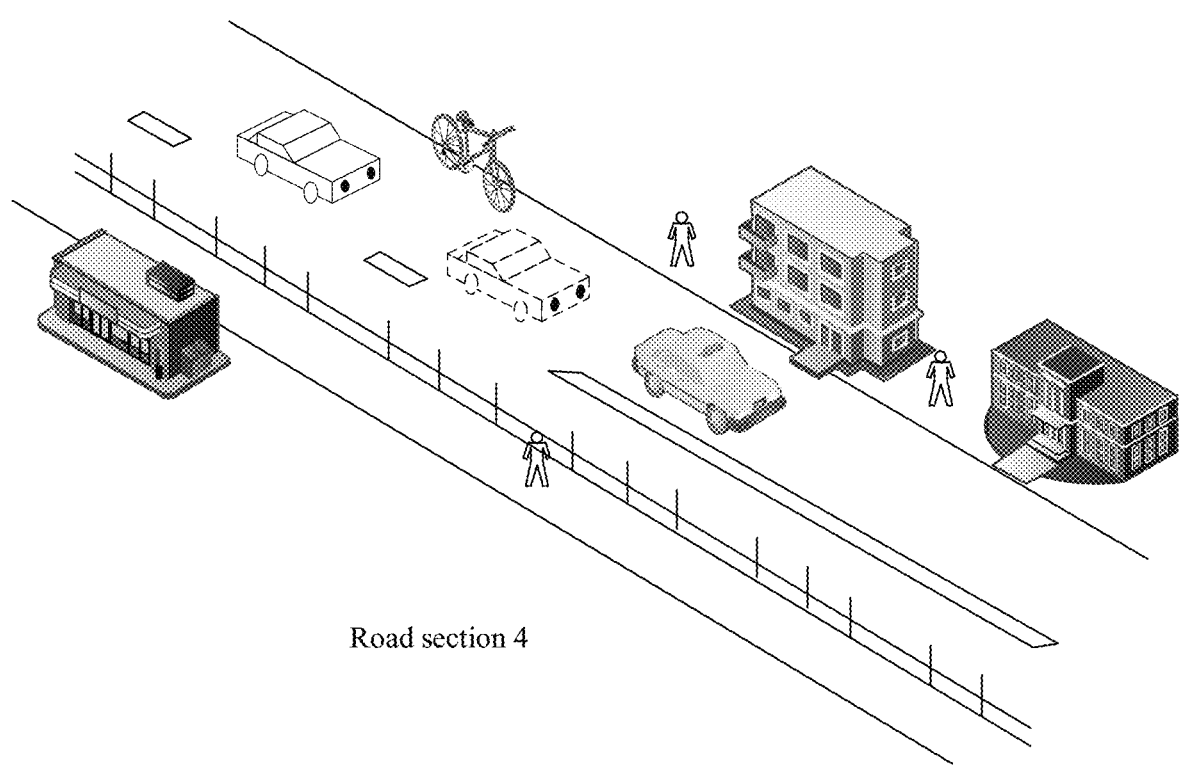
FIG. 10 is yet another schematic diagram of a scenario in which it is determined that an ODD is not exceeded according to an embodiment of the present disclosure.

For example, FIG. 10 is yet another schematic diagram of a scenario in which it is determined that the ODD is not exceeded according to an embodiment of the present disclosure. As shown in FIG. 10, at a moment T1, a vehicle running on a road section 4 executes an automated driving task, and the vehicle obtains a road condition of the current road section 4 by using a sensor (for example, a camera). As shown in FIG. 10, there are buildings, pedestrians, a bicycle, and a road guardrail on the roadside, and a lane line on the road. The foregoing objects and environmental conditions are sources of data obtained by the automated driving system. The data provided by these sources constitutes the second environmental parameter set in the second parameter set. The automated driving system compares the second environmental parameter set with the preset ODD, and if the automated driving system finds that all parameter content included in the second environmental parameter set has corresponding rules set in the ODD, and all the parameter content meets conditions or value requirements of the foregoing rules, the automated driving system determines that the automated driving system does not exceed the ODD on the section 4.

In a possible implementation, an example in which the second parameter set includes the second environmental parameter set and the second operating parameter set, and the first parameter set includes the first environmental parameter set and the first operating parameter set is used. Determining, when it is identified that the second parameter set is a subset of the first parameter set, that the automated driving system does not exceed the ODD of the target road section includes, when it is identified that the second environmental parameter set is a subset of the first environmental parameter set and the second operating parameter set is a subset of the first operating parameter set, determining that the automated driving system does not exceed the ODD of the target road section.

It may be understood that, when the first parameter set includes only the first environmental parameter set, only a corresponding second environmental parameter set in the set included in the second parameter set can be compared with the first environmental parameter set, but the second parameter set may include the second operating parameter set.

Step S504: When it is identified that the second environmental parameter set is not a subset of the first environmental parameter set or the second operating parameter set is not a subset of the first operating parameter set, determine that the automated driving system exceeds the ODD of the target road section.

Further, when the second parameter set is not in subsets of the first parameter set, it is determined that the automated driving system exceeds the ODD on the road section. It may be determined that a current condition of the automated driving system of the vehicle exceeds the ODD on the road section provided that any parameter set (the second environmental parameter set or the second operating parameter set) in the second parameter set does not meet the ODD.

Figure 11:
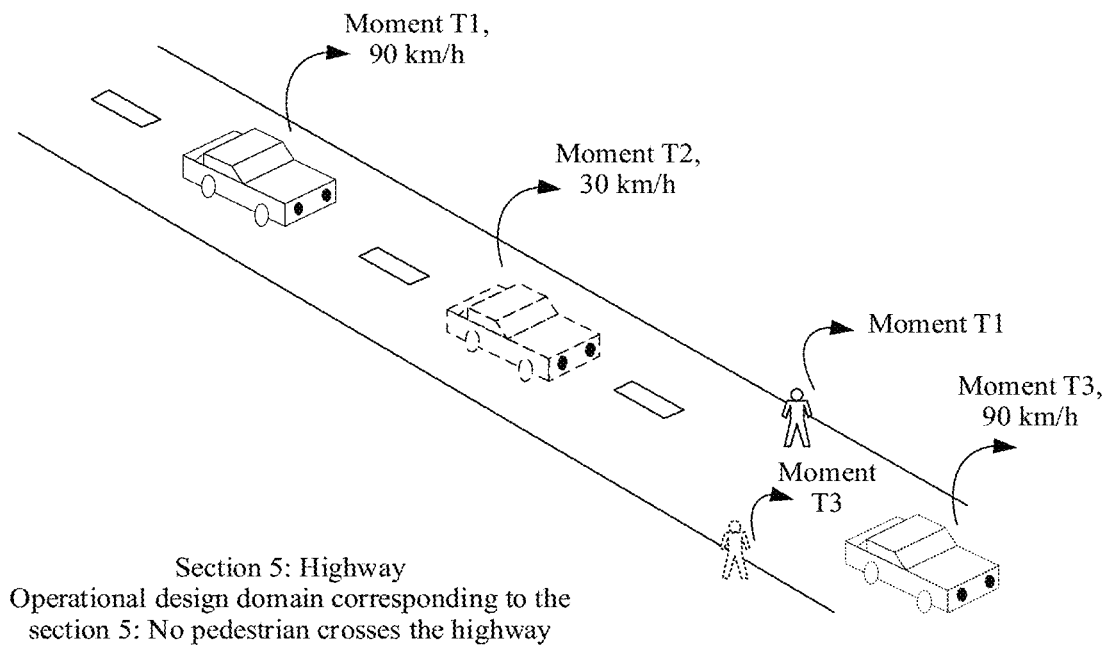
FIG. 11 is a schematic diagram of a scenario in which it is determined that an ODD is exceeded according to an embodiment of the present disclosure.

In a possible implementation, the first environmental parameter set includes one or more preset first objects, and the second environmental parameter set includes one or more second objects, and determining, when it is identified that the second environmental parameter set is not a subset of the first environmental parameter set, that the automated driving system exceeds the ODD of the target road section includes, when it is identified that at least one second object in the second environmental parameter set is different from any first object in the first environmental parameter set, determining that the automated driving system exceeds the ODD of the target road section. For example, FIG. 11 is a schematic diagram of a scenario in which it is determined that the ODD is exceeded according to an embodiment of the present disclosure. As shown in FIG. 11, an example in which the second parameter set includes a detected pedestrian (that is, object information in the second environmental parameter set), and only a vehicle-end database performs determining is used as an example. At a moment T1, a vehicle running on a road section 5 (namely, a highway) executes a highway pilot task, and a vehicle speed is 90 km/h. However, a pedestrian is detected on a lane. Because an ODD corresponding to the highway does not include feature information of a pedestrian (that is, no pedestrian crosses the highway), it is determined that the condition is an out-of-ODD condition. In this case, the vehicle may perform an obstacle avoiding policy or reduce the speed to 30 km/h at a moment T2 as shown in the figure. When no pedestrian is detected ahead the vehicle on the road on which the vehicle is running, the vehicle accelerates to 90 km/h at a moment T3.

Figure 12:
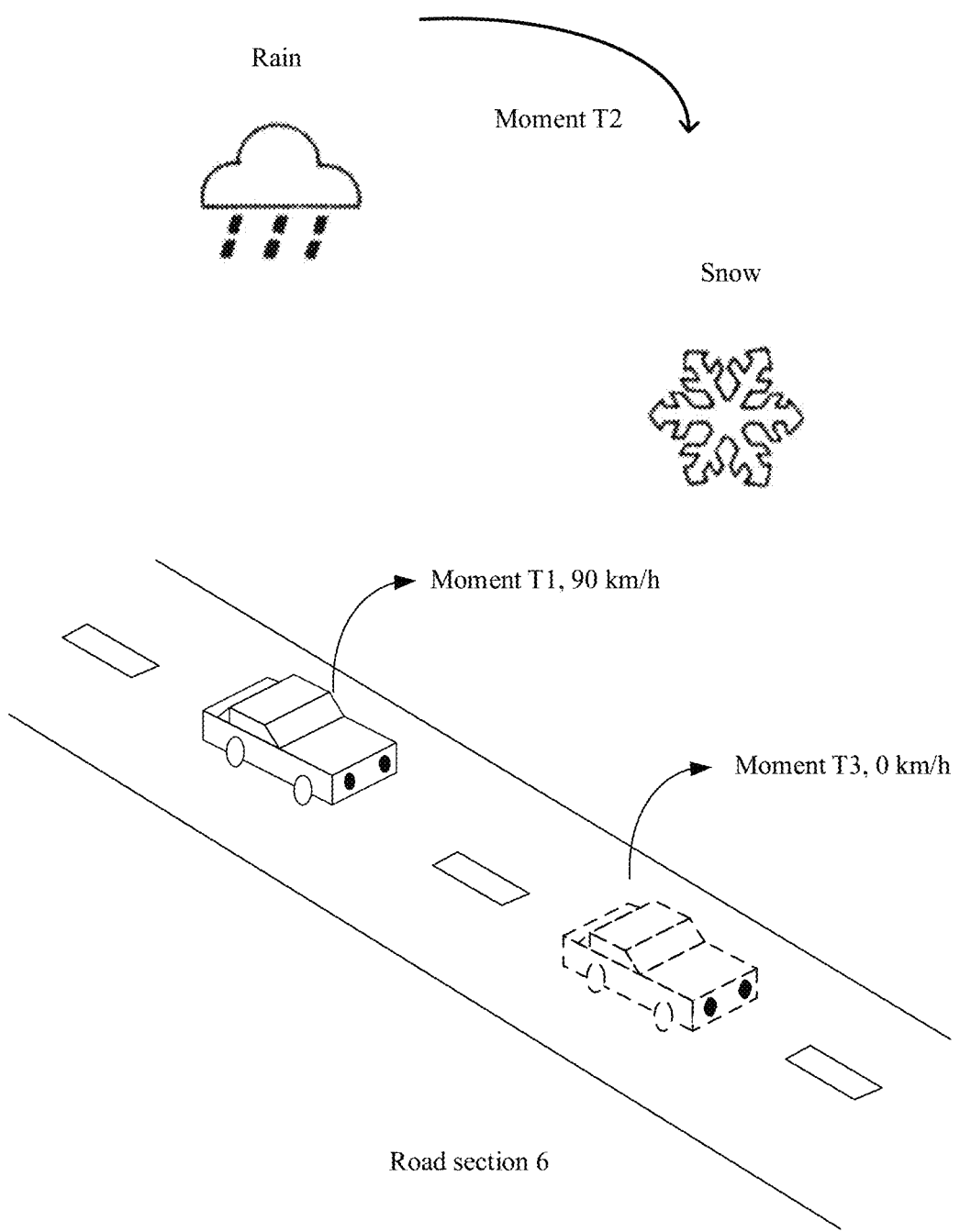
FIG. 12 is another schematic diagram of a scenario in which it is determined that an ODD is exceeded according to an embodiment of the present disclosure.

For another example, FIG. 12 is another schematic diagram of a scenario in which it is determined that the ODD is exceeded according to an embodiment of the present disclosure. As shown in FIG. 12, a speed of a vehicle at a moment T1 is 90 km/h, and weather information obtained at the moment T1 is rainy or a rainy day. It is assumed that a set corresponding to an ODD on a road section 6 includes only weather conditions (that is, dynamic information in the first environmental parameter): a sunny day and a rainy day. When the vehicle identifies that the weather information changes to snowy at a moment T2, it is determined that the ODD on the road section 6 is exceeded. A vehicle stopping policy is used. As shown in the figure, at a moment T3, the vehicle speed has been changed to 0 km/h. How to identify and determine the weather information is not limited in this embodiment of the present disclosure. Similar related descriptions are provided in the foregoing embodiments, and details are not described herein again.

Figure 13:
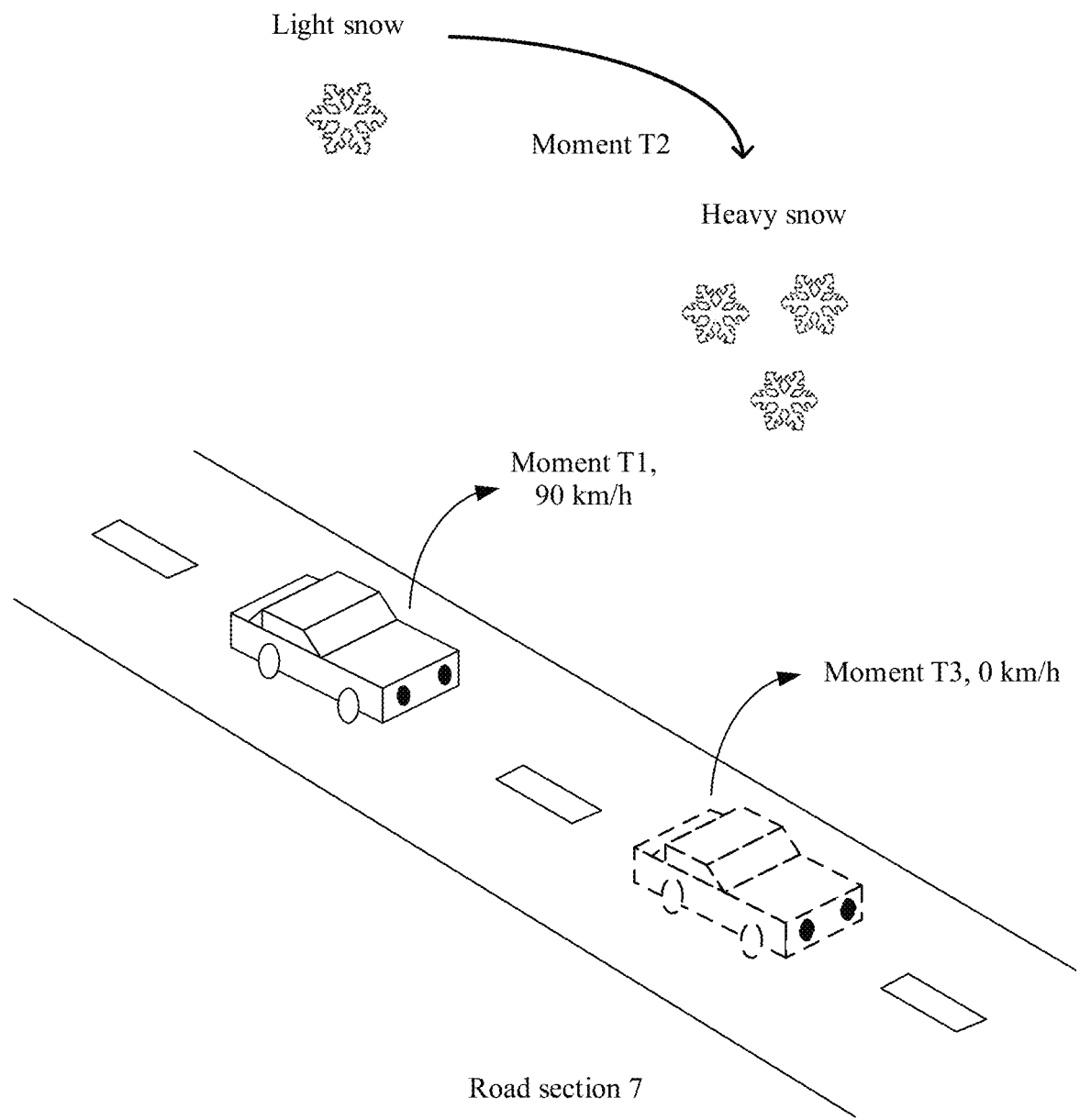
FIG. 13 is still another schematic diagram of a scenario in which it is determined that an ODD is exceeded according to an embodiment of the present disclosure.

In a possible implementation, the first environmental parameter set includes one or more preset first objects and value ranges corresponding to the one or more first object, the second operating parameter set includes one or more second objects and values corresponding to the one or more second objects, and determining, when it is identified that the second environmental parameter set is not a subset of the first environmental parameter set, that the automated driving system exceeds the ODD of the target road section includes, when it is identified that the second object is the same as the first object, and a value corresponding to the second object is not within a value range corresponding to the first object, determining that the automated driving system exceeds the ODD of the target road section. For example, FIG. 13 is still another schematic diagram of a scenario in which it is determined that the ODD is exceeded according to an embodiment of the present disclosure. As shown in FIG. 13, it is assumed that an ODD on a road section 7 only allows a corresponding vehicle to operate in light snow (for example, a specific snowfall value is specified). At a moment T1, a speed of the vehicle is 90 km/h. When light snow changes to heavy snow (for example, a snowfall value obtained by a sensor reaches a snowfall corresponding to the heavy snow or far exceeds a snowfall corresponding to the light snow) at a moment T2, the vehicle determines that the ODD is exceeded and takes corresponding measures. At a moment T3, an automated driving system requests a driver to take over and enter a manual driving mode to ensure vehicle safety in heavy snow.

Figure 14:
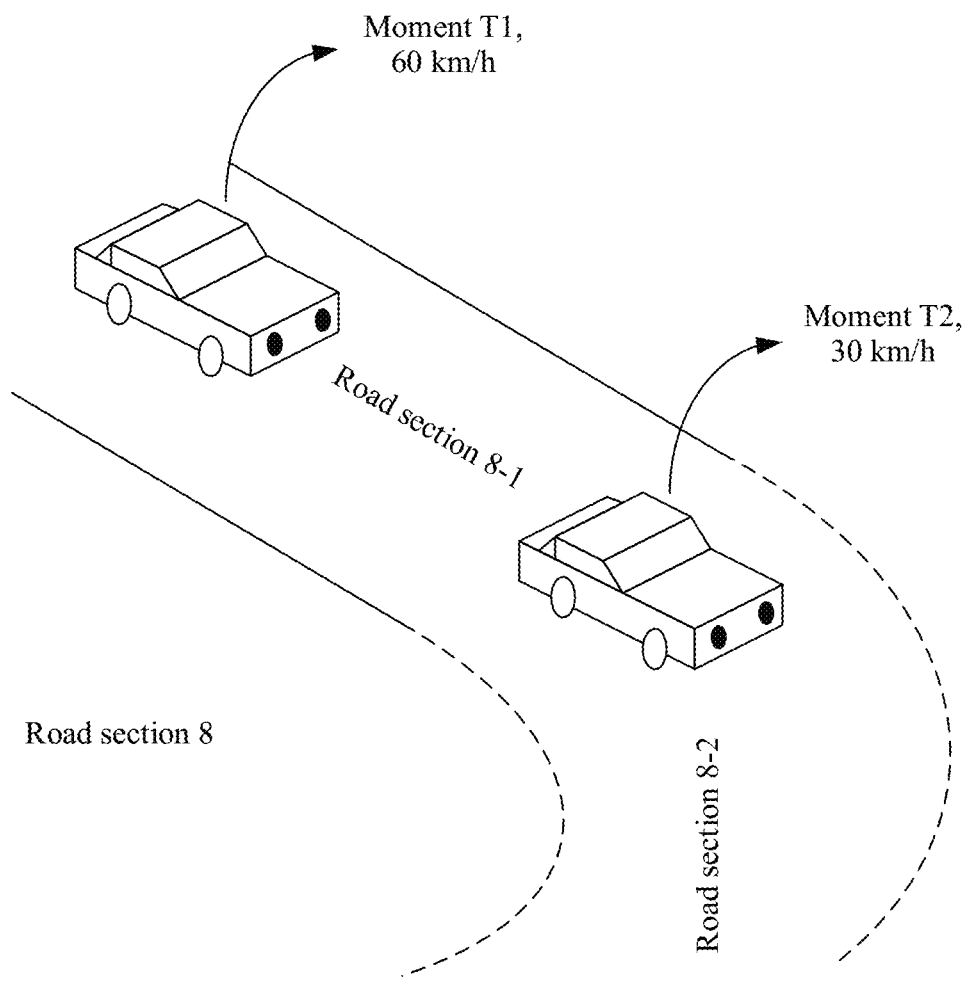
FIG. 14 is yet another schematic diagram of a scenario in which it is determined that an ODD is exceeded according to an embodiment of the present disclosure.

In a possible implementation, the first operating parameter set includes one or more first operating parameters and first value ranges corresponding to the one or more first operating parameters, and the second operating parameter set includes one or more second operating parameters and second values corresponding to the one or more second operating parameters, and determining, when it is identified that the second operating parameter set is not a subset of the first operating parameter set, that the automated driving system exceeds the ODD of the target road section includes, when the second operating parameter is the same as the first operating parameter, and it is identified that the second value is not within the first value range, determining that the automated driving system exceeds the ODD of the target road section. Usually, the first operating parameter set is a set of parameters used for normal operating of the automated driving system on the target road section, and the second operating parameter set is a set of actual operating parameters of the automated driving system on the target road section. Optionally, the second operating parameter set may alternatively include predicted operating parameters of the automated driving system on the target road section. The first operating parameter set and the second operating parameter set usually include same element items (for example, a vehicle speed, an engine revolution speed, and a sensor status), and only corresponding values are different. A value corresponding to a first operating parameter in the first operating parameter set is usually a value range, and a value corresponding to a second operating parameter in the second operating parameter set is usually a specific value. For example, FIG. 14 is yet another schematic diagram of a scenario in which it is determined that the ODD is exceeded according to an embodiment of the present disclosure. As shown in FIG. 14, a speed of a vehicle at a moment T1 on a road section 8-1 (a straight road section in the figure) is 60 km/h. A road section 8-2 is a road section in which turning needs to be performed. It is assumed that a turning speed that is defined by an ODD on the road section 8-2 (a curved road section in the figure) is less than or equal to 30 km/h. At the moment T1, the vehicle determines, based on both the vehicle speed and the preset ODD on the road section 8-2, that if the vehicle continues to run at a uniform speed, the preset ODD is about to be exceeded when the vehicle enters a curve (that is, the second operating parameter is the same as the first operating parameter, and both are a vehicle speed parameter, but the second value (60 km/h) is not within the first value range (less than or equal to 30 km/h)), and the speed is further controlled to be 30 km/h, so that the vehicle can safely turn.

Step S505: Reduce the speed of the vehicle, or request a driver of the vehicle to take over, or control the vehicle to stop running.

Figure 15:
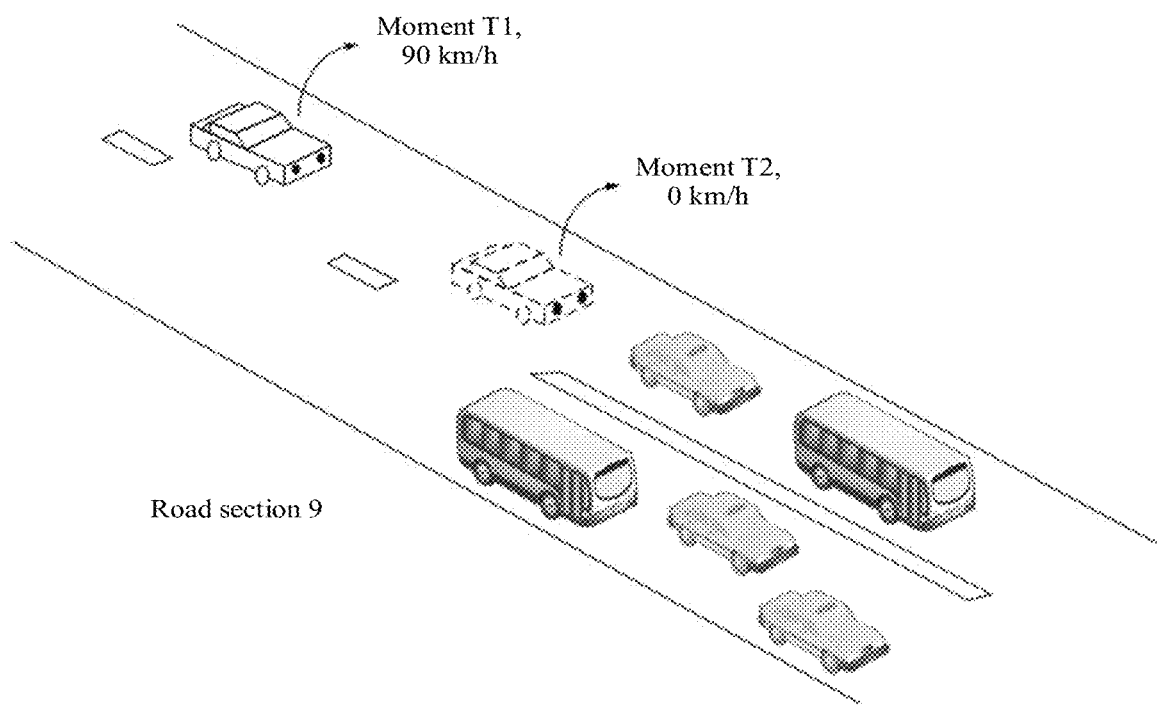
FIG. 15 is a schematic diagram of a scenario of responding to an out-of-ODD condition according to an embodiment of the present disclosure.

Further, for an out-of-ODD condition, the vehicle speed may be reduced, the vehicle may be controlled to stop running, or the driver of the vehicle may be requested to take over, or another response policy may be used. A specific response policy is not limited in this embodiment of the present disclosure. It may be understood that a specific response policy should be used based on an actual situation. For example, FIG. 15 is a schematic diagram of a scenario of responding to an out-of-ODD condition according to an embodiment of the present disclosure. As shown in FIG. 15, on a road section 9, a speed of a vehicle at a moment T1 is 90 km/h, a moment T2 is a moment after it is determined that an ODD is exceeded, and a vehicle speed at this moment is controlled to be 0 km/h. Assuming that the ODD on the road section 9 does not include a lane-level dynamic element (a congestion situation shown in the figure), after the vehicle determines that the ODD is exceeded, the vehicle may request a driver of the vehicle to take over, to avoid collision with another vehicle.

In this embodiment of the present disclosure, the ODD (for example, the ODD for automated driving on a stretch of highway is a sunny day, a road with lane lines, and a vehicle speed not higher than a value) of the target road section (a stretch of road that includes a start point and an end point, for example, the stretch of highway) where the automated driving system of the vehicle is located is determined, and the second parameter set (including the second environmental parameter set, or the second operating parameter set, or the second environmental parameter set and the second environmental parameter set) obtained by the automated driving system is compared with the first parameter set (including the first environmental parameter set, or the first operating parameter set, or the first environmental parameter set and the first operating parameter set) corresponding to the ODD. When it is identified that the second parameter set is a subset of the first parameter set (for example, the second parameter set is a sunny day, detected lane lines, and a vehicle speed 80 km/h, and meets ODD requirements of the highway), it is determined that the automated driving system does not exceed the ODD of the road section on the current target road section. That is, on the target road section, factors such as a condition of the vehicle/automated driving system and a condition of a running environment all within the preset ODD. Each parameter included in the first parameter set is a preset parameter, a parameter value, a value range, and/or the like that are/is compared with the obtained second parameter set (for example, a vehicle speed not higher than a value is a speed requirement designed for a road section on a specific highway, and the requirement is used as a reference). Further, the second environmental parameter set may include a weather condition such as a sunny day and a rainy day, traffic information, road information, object information such as a pedestrian, a bicycle, and a speed limit sign, and the like. The second operating parameter set may include various data of the automated driving system or the vehicle, such as a vehicle speed, a computing capability, and a storage capability. It is determined, by identifying parameters, whether the vehicle exceeds an operating condition, and when the vehicle exceeds the operating condition, a corresponding response policy such as stopping, slowing down, or requesting a driver to take over to enter a manual driving state is taken in time, to ensure safe running of the autonomous vehicle.

It should be noted that the foregoing embodiments all examples for descriptions. The embodiments related to this disclosure may include but are not limited to the foregoing embodiments.

Figure 16:
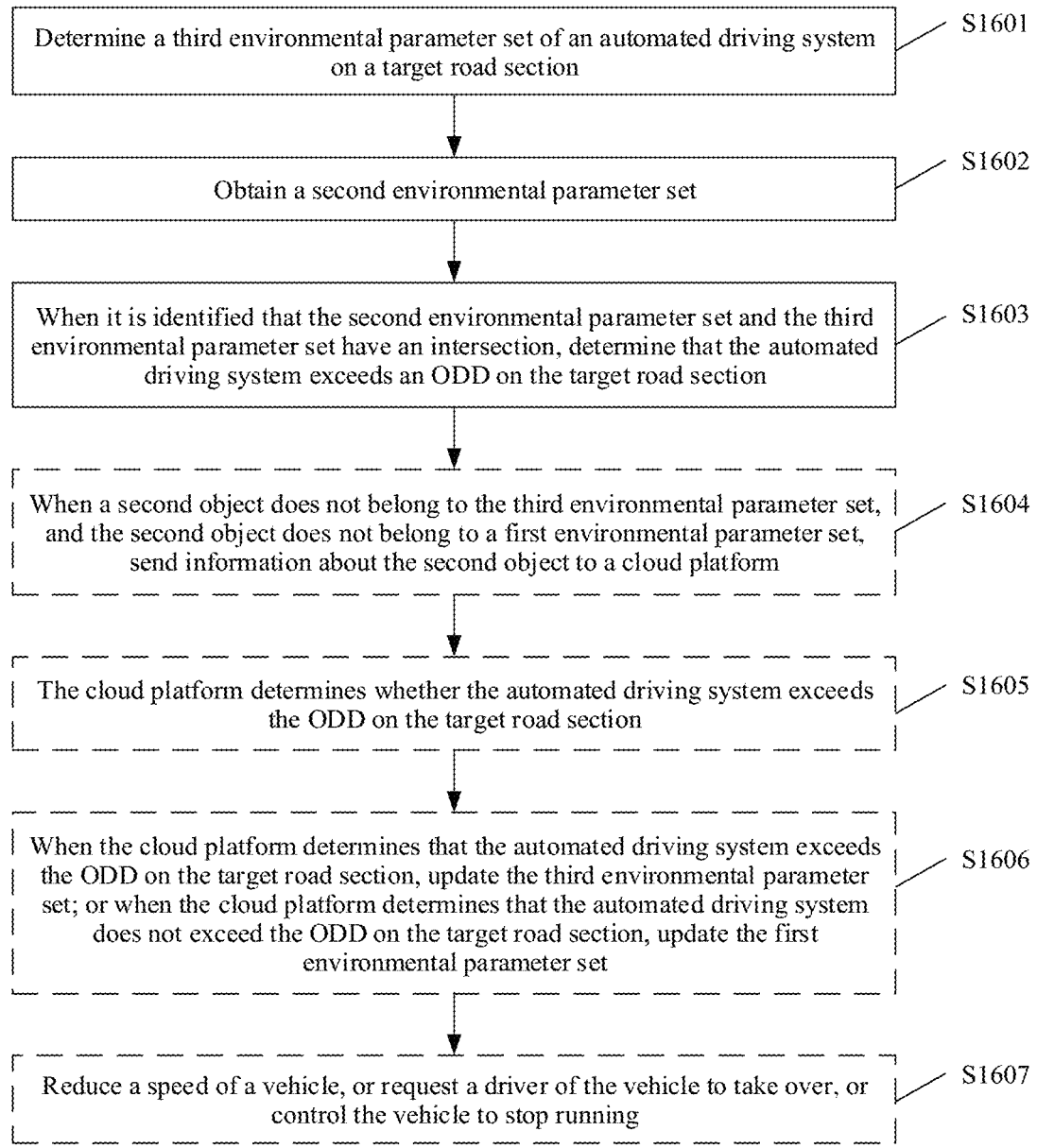
FIG. 16 is a schematic flowchart of another ODD determining method according to an embodiment of the present disclosure.

With reference to the foregoing ODD determining architecture, the following describes another ODD determining method provided in an embodiment of the present disclosure. FIG. 16 is a schematic flowchart of another ODD determining method according to an embodiment of the present disclosure. As shown in the figure, the method is performed by the ECU 2, and may include step S1601 to step S1607. Optional steps include step S1604 to step S1607.

Step S1601: Determine a second environmental parameter set of an automated driving system on a target road section.

Further, after a vehicle has been started or after a condition is met (for example, when the vehicle runs on a road section or receives a driving instruction), the automated driving system (or an automated driving vehicle system, or automated driving system of the vehicle) executes a dynamic driving task based on data obtained by a sensor subsystem (including a sensor), a preset running condition determining rule, a vehicle running decision algorithm, or the like, to achieve safe and effective running in an unmanned condition. In a running process of the vehicle, the automated driving system may obtain a second parameter set by using a sensor subsystem or by using a V2X means. The second parameter set includes the second environmental parameter set, and optionally, the second parameter set further includes a second operating parameter set. The second environmental parameter set is a set of environmental parameters of the automated driving system on the target road section.

The third environmental parameter set and a first environmental parameter set in a first parameter set corresponding to an ODD of the target road section have no intersection. When the third environmental parameter set is preset, the obtained second parameter set should include at least the second environmental parameter set for comparison with the third environmental set, and optionally, may further include the second operating parameter set.

In the running process of the vehicle, the second parameter set (for example, operating data inside the vehicle and external environmental data obtained by sensors) is obtained and the third environmental parameter set is determined. Optionally, the third environmental parameter set may not be associated with the target road section or location information, or may correspond to the target road section or location information (for example, after a vehicle location is determined based on GPS positioning, the third environmental parameter set corresponding to the current road section is obtained from a vehicle-end database). The second environmental parameter set is compared with the third environmental parameter set, it is determined whether the ODD is exceeded, and the vehicle is controlled to make a response based on a determining result. Optionally, in the running process, the second environmental parameter set associated with the current road section/location information is first obtained, and then the third environmental parameter set is obtained. After comparison and determining, the vehicle is controlled to make a response. Optionally, the third environmental parameter set is determined while the second environmental parameter set is obtained by using the sensor, and after comparison and determining, the vehicle is controlled to make a response. A sequence of obtaining the second environmental parameter set and the third environmental parameter set is not limited in this embodiment of the present disclosure.

When the determining result is positive, the dynamic driving task that is being executed by the vehicle is stopped. For example, if A is an out-of-ODD object, A is identified on a specific road section (data in the database describes feature information of an object out of the ODD, and related feature information of A is pre-stored in the database, therefore, the vehicle may determine A), and the vehicle is stopped from running, or a driver of the vehicle is requested to take over.

Step S1602: Obtain the third environmental parameter set.

Further, the third environmental parameter set includes at least one object (for example, a traffic light, a pedestrian, or an animal). Optionally, the at least one object is obtained from a database of the automated driving system associated with a current location of the vehicle or associated with the target road section. Optionally, the third parameter set may not be associated with the target road section or location information, or may correspond to the target road section or location information Step S1603: When it is identified that the second environmental parameter set and the third environmental parameter set have an intersection, determine that the automated driving system exceeds the ODD of the target road section.

Further, it is determined whether detected or obtained environmental parameters include at least one first object. When the determining result is positive (that is, the at least one first object is included), a first dynamic driving task is stopped. The first object may be stored in a database, and the database may include a map database, or at least one first object associated with a current location of the vehicle or the target road section may be obtained based on the map database. The first object is a preset target object out of the ODD, that is, a target object that is forbidden to appear when the automated driving system operates on the target road section.

In a possible implementation, the third environmental parameter set includes one or more preset third objects, and the second environmental parameter set includes one or more second objects, and determining, when it is identified that the second environmental parameter set and the third environmental parameter set have an intersection, that the automated driving system exceeds the ODD of the target road section includes, when it is identified that at least one second object in the second environmental parameter set is the same as any third object in the third environmental parameter set, determining that the automated driving system exceeds the ODD of the target road section.

For example, a static object is used as an example. At least one piece of preset object information (for example, a static object) associated with the location information of the vehicle or the target road section is obtained from the map database. In general, a (high-definition) map database stores several pieces of object information related to a location. These object information are used to describe objects that are out of the ODD at this location. For example, there is a traffic light on the roadside. If the automated driving system may not recognize the traffic light, the dynamic driving task needs to be stopped once information about the traffic light appears. In this case, the information that is stored in the (high-definition) map database and used to describe a speed limit sign or a traffic light is referred to as object information. Then, information about at least one surrounding object is sensed. At least one sensor device is disposed on the vehicle, and the sensor device is configured to obtain environmental conditions outside and/or inside the vehicle. In this case, the sensor device on the vehicle may obtain an environmental condition around the vehicle, including a traffic light on the roadside. Finally, it is determined whether the at least one piece of sensed surrounding object information includes the at least one preset object, and when the at least one preset object is included, the dynamic driving task is stopped. The decision subsystem of the vehicle may have a target recognition algorithm capable of determining whether an actual surrounding object recognized by the sensor is consistent with a preset object stored in an object database (a database of out-of-ODD objects). When it is determined that the two objects are consistent, it is considered that an object out of the operating condition exists, and in this case, the dynamic driving task needs to be stopped immediately.

Step S1604: When the second object does not belong to the third environmental parameter set, and the second object does not belong to the first environmental parameter set, send information about the second object to a cloud platform.

Further, in an automated driving operating process of the vehicle, when the automated driving system cannot recognize a target object because the target object may not exist in the vehicle-end object database, the automated driving system may request the cloud to perform determining. For example, if construction or traffic control temporarily occurs on a road, and some temporary irregular construction isolation facilities appear on the road, the vehicle-end system may not store such objects. In this case, the vehicle may first slow down or stop, then request the cloud to perform determining, and update ODD data based on a determining result from the cloud. For example, at least one actual surrounding object is sensed. Information about the obtained actual object can match no object in the database. In this embodiment of the present disclosure, all objects include but are not limited to object information that is obtained from the map database and that is stored in the database associated with the location information of the vehicle. Optionally, if a matching similarity or possibility is lower than a threshold, it is determined that this case is in a gray-scale determining phase. Then, feature information of the unrecognized actual object that carries the location information is sent to the cloud platform. The feature information of the actual object may be a shape, a size (length, width, and height), a color attribute, location information (for example, relative location information, and height information), and the like of the object. Optionally, in this embodiment of the present disclosure, raw data may be further reported. For example, raw data including information about the first object may be extracted for reporting. The raw data may be data from a video sensor, or may be data from a radar sensor. Finally, a feedback from the cloud platform is received, where the feedback may be used to indicate whether the unrecognized actual object exceeds the ODD.

Figure 17:
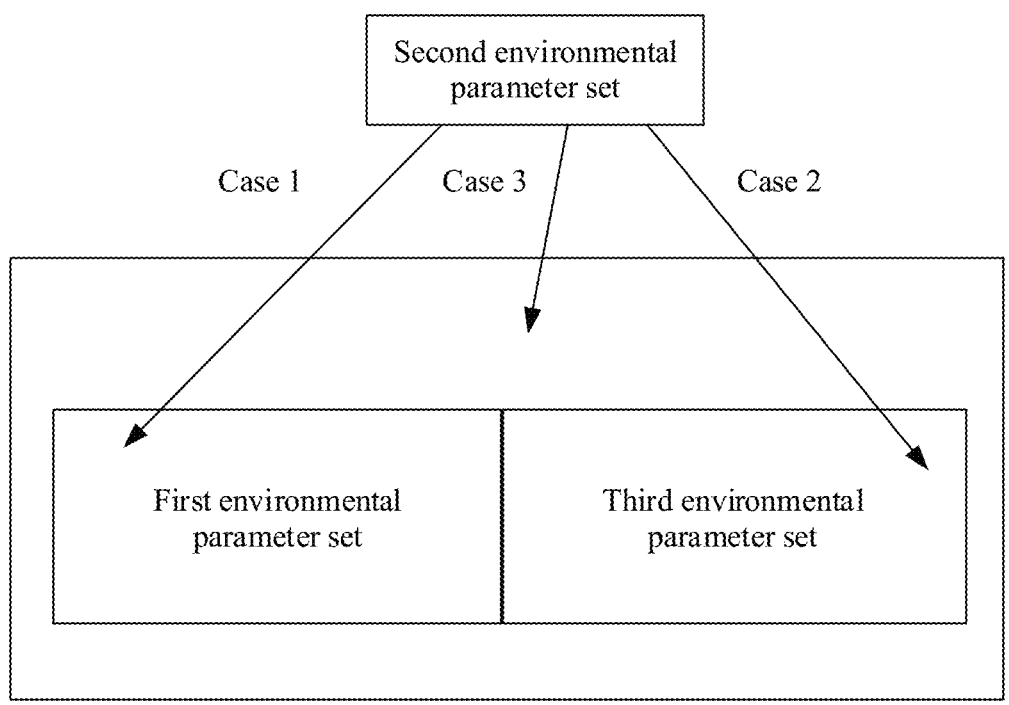
FIG. 17 is a schematic diagram of classification of determining cases according to an embodiment of the present disclosure.

For example, FIG. 17 is a schematic diagram of classification of determining cases according to an embodiment of the present disclosure. As shown in FIG. 17, an element or a subset of the second environmental parameter set may be in a case 1 (that is, the element or the subset of the second environmental parameter set is an element or a subset of the first environmental parameter set), or in a case 2 (that is, the element or the subset of the second environmental parameter set is an element or a subset of the third environmental parameter set), or in a case 3 (that is, the element or the subset of the second environmental parameter set is an element or a subset of a set corresponding to an area out of the first environmental parameter set and the third environmental parameter set). In the case 3, information about the second object is sent to the cloud platform, and the cloud platform assists the vehicle in determining. It may be understood that sets corresponding to the case 1 and the case 2 have no intersection. In addition, the three cases are independent. That is, it is impossible to store an element that belongs to both the case 1 and the case 2.

In a possible implementation, the feature information of the second object is sent to a road side unit or the cloud platform, where the feature information of the second object includes one or more of a shape, a size, a color attribute, and location information of the object. The object is accurately recognized based on the feature information of the object and it determined whether the object exceeds the ODD.

Step S1605: The cloud platform determines whether the automated driving system exceeds the ODD of the target road section.

Figure 18:
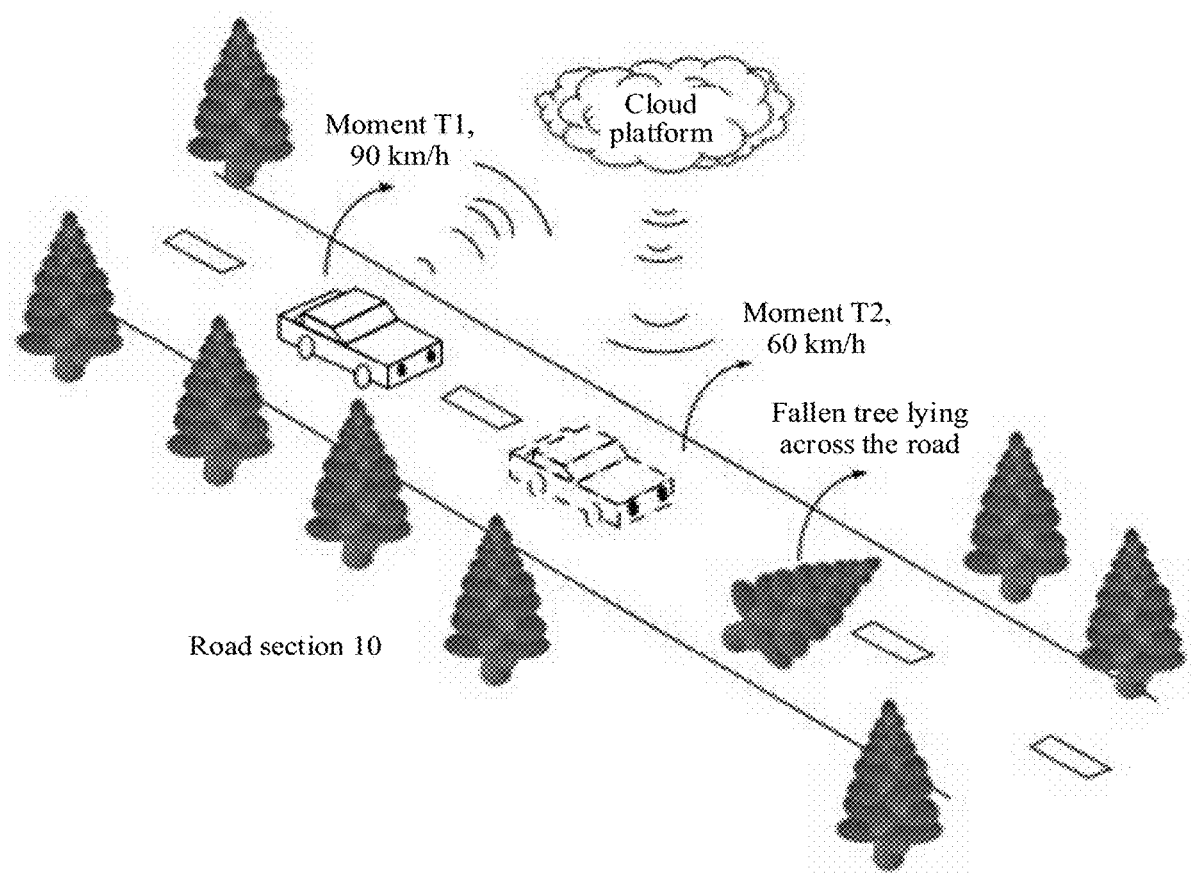
FIG. 18 is a schematic diagram of a scenario in which a cloud platform assists in determining an ODD according to an embodiment of the present disclosure.

Further, in the automated driving operating process, when the automated driving system cannot recognize a target object because the target object may not exist in the vehicle-end object database, the automated driving system may request the cloud to perform determining. For example, if construction or traffic control temporarily occurs on a road, and some temporary irregular construction isolation facilities appear on the road, the vehicle-end system may not store such objects. In this case, the vehicle may first slow down, and then request the cloud to perform determining. For example, FIG. 18 is a schematic diagram of a scenario in which the cloud platform assists in determining an ODD according to an embodiment of the present disclosure. As shown in FIG. 18, a vehicle runs on a road section 10, and a vehicle speed at a moment T1 is 90 km/h. It is detected, at the moment T1, that there is a fallen tree lying across the road in front of the vehicle, and the object (namely, the object) is an object that cannot be recognized by the vehicle end currently. The vehicle obtains feature data (namely, the information about the second object) of the object, and sends the information about the second object to the cloud platform. The cloud platform determines, through analysis, that the object exceeds the ODD of the current road section, and feeds back a determining result to the vehicle.

Step S1606: When the cloud platform determines that the automated driving system exceeds the ODD of the target road section, update the third environmental parameter set, or when the cloud platform determines that the automated driving system does not exceed the ODD of the target road section, update the first environmental parameter set.

Further, the ODD data is updated based on the determining result from the cloud. When the cloud (that is, the cloud platform) determines that this condition is an out-of-ODD condition, the third environmental parameter set is updated, for example, the second object is added to the third environmental parameter set, otherwise, the first environmental parameter set is updated, for example, the second object is added to the first environmental parameter set.

Step S1607: Reduce the speed of the vehicle, or request the driver of the vehicle to take over, or control the vehicle to stop running.

For details, refer to related descriptions of step S505. Details are not described herein again.

The foregoing describes the method embodiments provided in the embodiments of the present disclosure, and the following describes the virtual apparatus embodiments related to the embodiments of the present disclosure.

Figure 19:
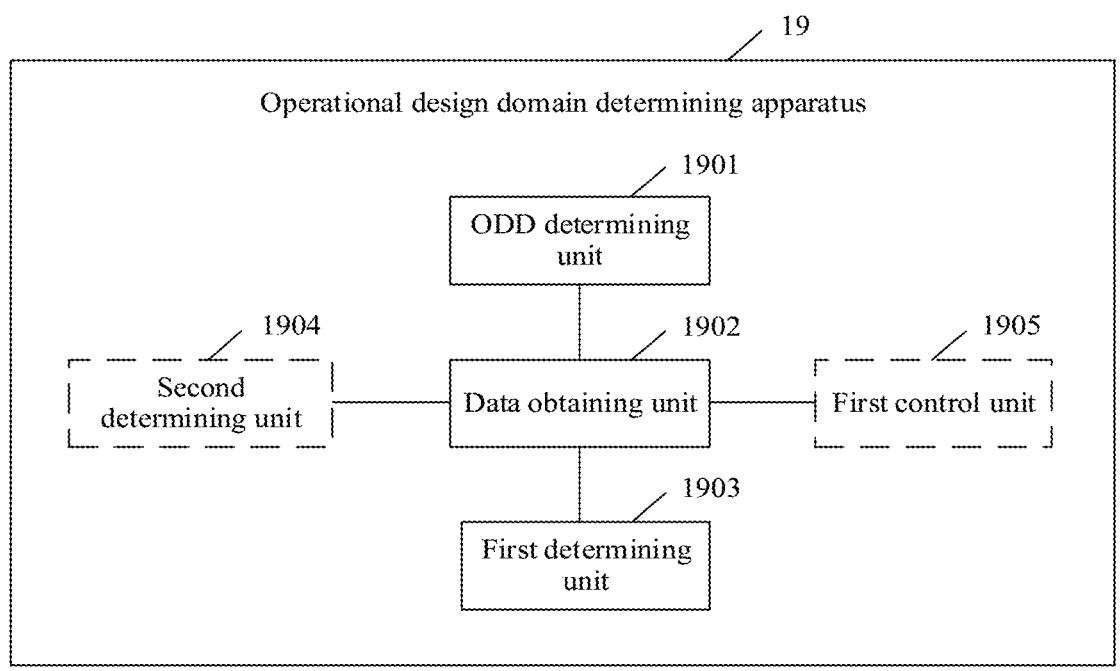
FIG. 19 shows an operational design domain ODD determining apparatus according to an embodiment of the present disclosure.

FIG. 19 shows an ODD determining apparatus according to an embodiment of the present disclosure. The ODD determining apparatus is applied to an automated driving system of a vehicle. The apparatus 19 may include an ODD determining unit 1901, a data obtaining unit 1902, a first determining unit 1903, a second determining unit 1904, and a first control unit 1905. Optional units may include the second determining unit 1904 and the first control unit 1905.

The ODD determining unit 1901 is configured to determine an ODD of a target road section where the automated driving system is located, where a first parameter set corresponding to the ODD includes a first environmental parameter set and/or a first operating parameter set of the automated driving system.

The data obtaining unit 1902 is configured to obtain a second parameter set, where the second parameter set includes a second environmental parameter set and/or a second operating parameter set, the second environmental parameter set is a set of environmental parameters of the automated driving system on the target road section, and the second operating parameter set is a set of operating parameters of the automated driving system on the target road section.

The first determining unit 1903 is configured to, when it is identified that the second parameter set is a subset of the first parameter set, determine that the automated driving system does not exceed the ODD of the target road section.

In a possible implementation, the second parameter set includes the second environmental parameter set and the second operating parameter set, and the first parameter set includes the first environmental parameter set and the first operating parameter set. The first determining unit 1903 is further configured to, when it is identified that the second environmental parameter set is a subset of the first environmental parameter set and the second operating parameter set is a subset of the first operating parameter set, determine that the automated driving system does not exceed the ODD of the target road section.

In a possible implementation, the data obtaining unit 1902 is further configured to receive ODD indication information sent by a road side unit or a cloud platform, and determine the second parameter set based on the ODD indication information.

In a possible implementation, the data obtaining unit 1902 is further configured to obtain an element in the second parameter set and a value corresponding to the element by using a sensor of the vehicle, a road side unit, or a cloud platform, or obtain an element in the second parameter set by using a sensor of the vehicle, a road side unit, or a cloud platform.

In a possible implementation, the first operating parameter includes a speed of the vehicle.

In a possible implementation, the first parameter set corresponds to the target road section.

In a possible implementation, the first parameter set is a set stored in a database corresponding to the target road section.

In a possible implementation, the apparatus further includes the second determining unit 1904 configured to, when it is identified that the second environmental parameter set is not a subset of the first environmental parameter set or the second operating parameter set is not a subset of the first operating parameter set, determine that the automated driving system exceeds the ODD of the target road section.

In a possible implementation, the first environmental parameter set includes one or more preset first objects, and the second environmental parameter set includes one or more second objects. The second determining unit 1904 is further configured to, when it is identified that at least one second object in the second environmental parameter set is different from any first object in the first environmental parameter set, determine that the automated driving system exceeds the ODD of the target road section.

In a possible implementation, the first operating parameter set includes one or more first operating parameters and first value ranges corresponding to the one or more first operating parameters, and the second operating parameter set includes one or more second operating parameters and second values corresponding to the one or more second operating parameters. The second determining unit 1904 is further configured to, when the second operating parameter is the same as the first operating parameter, and it is identified that the second value is not within the first value range, determine that the automated driving system exceeds the ODD of the target road section.

In a possible implementation, the apparatus further includes the first control unit 1905 configured to, after it is determined that the automated driving system exceeds the ODD of the target road section, reduce the speed of the vehicle, or request a driver of the vehicle to take over, or control the vehicle to stop running.

It should be noted that, for the ODD determining apparatus described in this embodiment of the present disclosure, refer to related descriptions of the ODD determining method in the method embodiments described in FIG. 5 and FIG. 16. Details are not described herein again.

Figure 20:
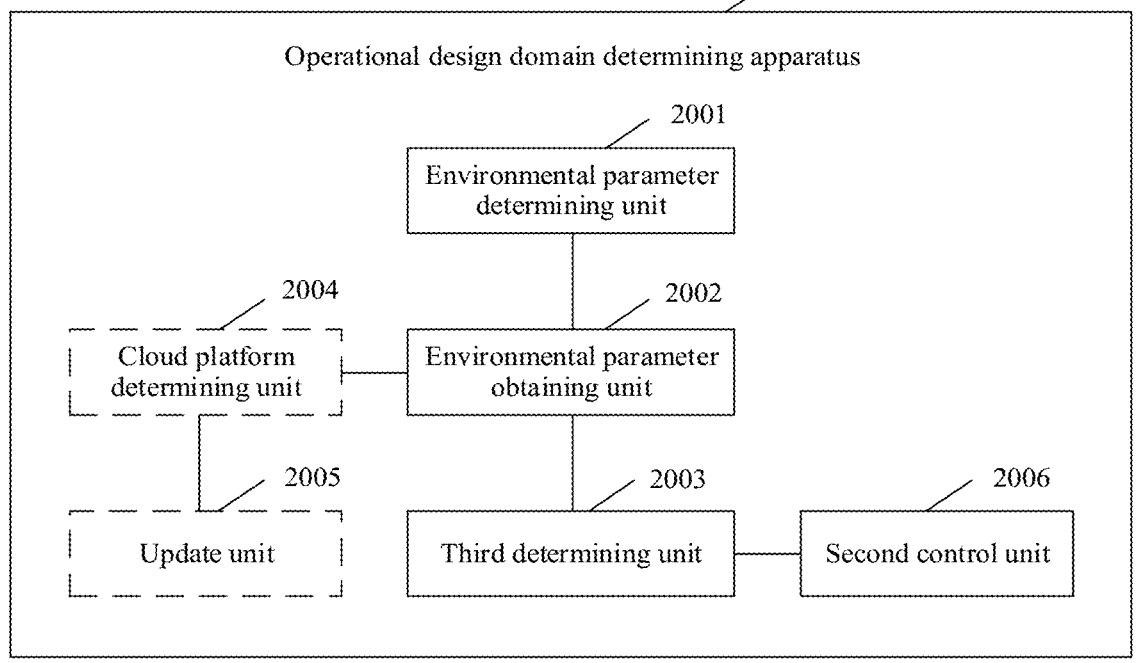
FIG. 20 shows another operational design domain ODD determining apparatus according to an embodiment of the present disclosure.

FIG. 20 shows another ODD determining apparatus according to an embodiment of the present disclosure. The ODD determining apparatus is applied to an automated driving system of a vehicle. The apparatus 20 may include an environmental parameter determining unit 2001, an environmental parameter obtaining unit 2002, a third determining unit 2003, a cloud platform determining unit 2004, an update unit 2005, and a second control unit 2006. Optional units may include the cloud platform determining unit 2004, the update unit 2005, and the second control unit 2006.

The environmental parameter determining unit 2001 is configured to determine a third environmental parameter set of a target road section where the automated driving system is located, where the third environmental parameter set and a first environmental parameter set in a first parameter set corresponding to an ODD of the target road section have no intersection.

The environmental parameter obtaining unit 2002 is configured to obtain a second environmental parameter set, where the second environmental parameter set is a set of environmental parameters of the automated driving system on the target road section.

The third determining unit 2003 is configured to, when it is identified that the second environmental parameter set and the third environmental parameter set have an intersection, determine that the automated driving system exceeds the ODD of the target road section.

In a possible implementation, the third environmental parameter set includes one or more preset third objects, and the second environmental parameter set includes one or more second objects. The third determining unit 2003 is further configured to, when it is identified that at least one second object in the second environmental parameter set is the same as any third object in the third environmental parameter set, determine that the automated driving system exceeds the ODD of the target road section.

In a possible implementation, the apparatus further includes the cloud platform determining unit 2004 configured to, when the second object does not belong to the third environmental parameter set, and the second object does not belong to the first environmental parameter set, send information about the second object to a cloud platform, where the cloud platform determines whether the automated driving system exceeds the ODD of the target road section.

In a possible implementation, the apparatus further includes the update unit 2005 configured to, after the cloud platform determines whether the automated driving system exceeds the ODD of the target road section, when the cloud platform determines that the automated driving system exceeds the ODD of the target road section, update the third environmental parameter set, or when the cloud platform determines that the automated driving system does not exceed the ODD of the target road section, update the first environmental parameter set.

In a possible implementation, the apparatus further includes the second control unit 2006 configured to reduce a speed of the vehicle, or request a driver of the vehicle to take over, or control the vehicle to stop running.

It should be noted that, for the ODD determining apparatus described in this embodiment of the present disclosure, refer to related descriptions of the ODD determining method in the method embodiments described in FIG. 5 and FIG. 16. Details are not described herein again.

Figure 21:
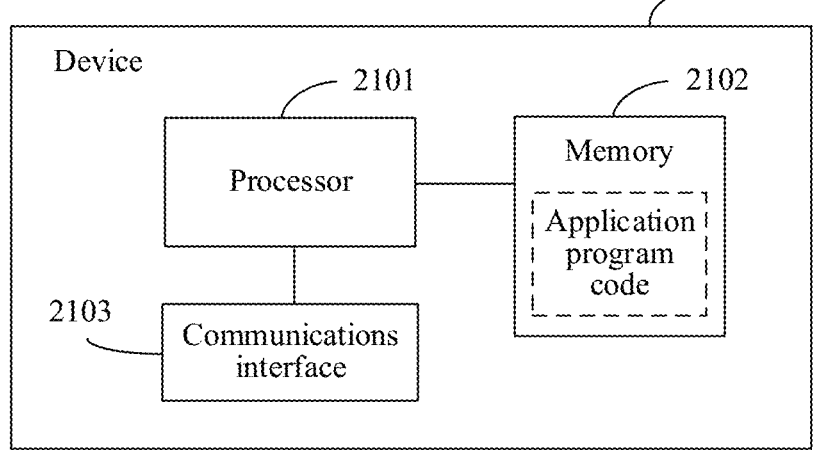
FIG. 21 is a schematic diagram of a structure of a device according to an embodiment of the present disclosure.

FIG. 21 is a schematic diagram of a structure of a device according to an embodiment of the present disclosure. As shown in FIG. 21, an ODD determining apparatus may be implemented in the structure in FIG. 21. The device 21 includes at least one processor 2101, at least one memory 2102, and at least one communications interface 2103. In addition, the device may further include common components such as an antenna. Details are not described herein again.

The processor 2101 may be a general-purpose CPU, a microprocessor, an application-specific integrated circuit (ASIC), or one or more integrated circuits for controlling program execution of the foregoing solution.

The communications interface 2103 is configured to communicate with another device or a communications network.

The memory 2102 may be a ROM or another type of static storage device capable of storing static information and instructions, or a RAM, or another type of dynamic storage device capable of storing information and instructions, or may be an electrically erasable programmable ROM (EE-PROM), a compact disc (CD) ROM (CD-ROM) or another CD storage medium, optical disc storage medium (including a CD, a laser disc, an optical disc, a DIGITAL VERSATILE DISC (DVD), a BLU-RAY disc, or the like), a magnetic disk storage medium, another magnetic storage device, or any other medium that can be configured to carry or store expected program code in a form of instructions or a data structure and that is accessible by a computer, but is not limited thereto. The memory may exist independently, and may be connected to the processor through a bus. Alternatively, the memory may be integrated with the processor.

The memory 2102 is configured to store application program code for executing the foregoing solution, and the processor 2101 controls execution. The processor 2101 is configured to execute the application program code stored in the memory 2102.

When the device shown in FIG. 21 is an ODD determining apparatus, the code stored in the memory 2102 may perform the ODD determining method provided in FIG. 5 or FIG. 16.

It should be noted that, for the function of the device 210 described in this embodiment of the present disclosure, refer to related descriptions of the method embodiments described in FIG. 5 and FIG. 16. Details are not described herein again.

Figure 22:
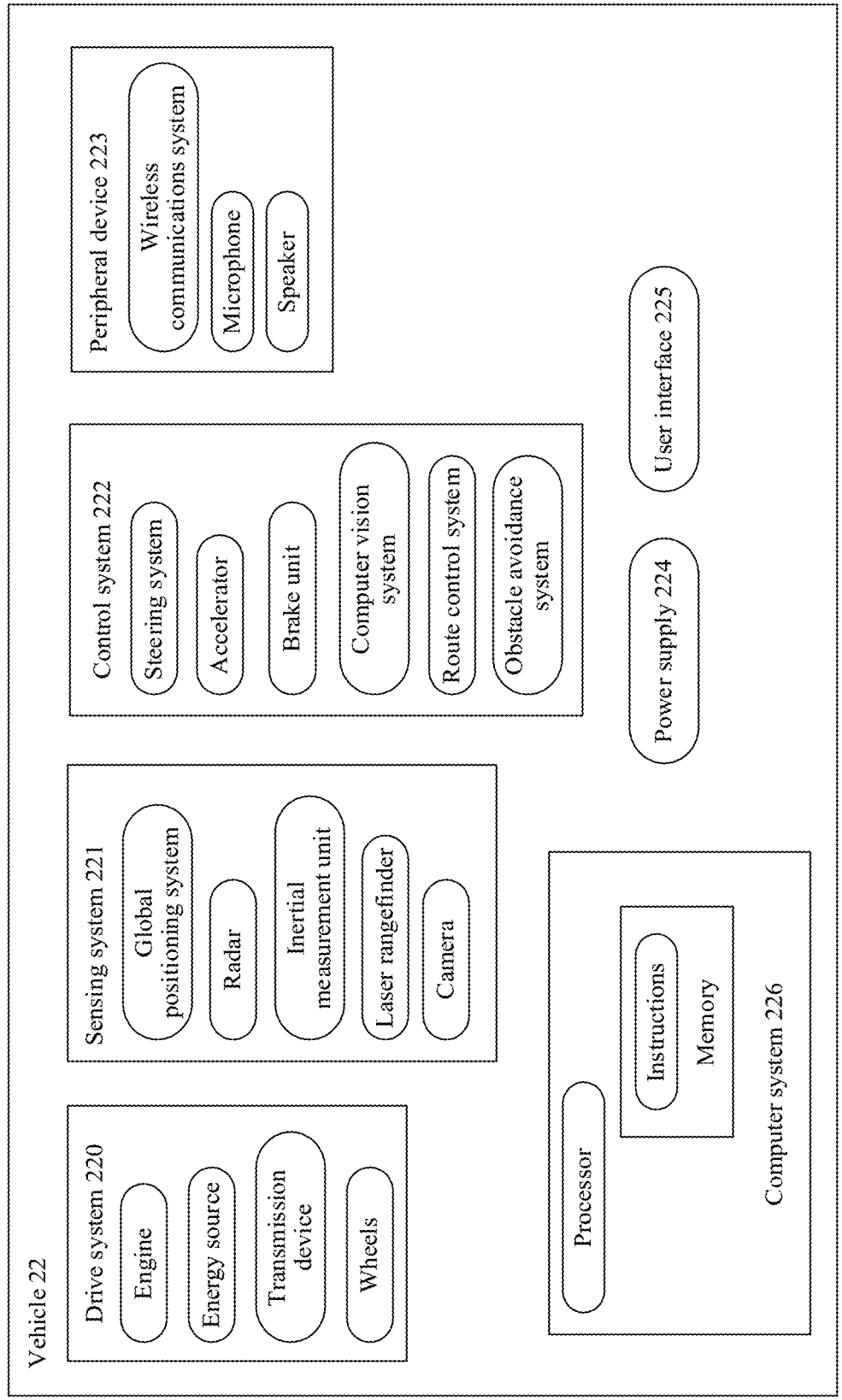
FIG. 22 is a schematic diagram of a structure of a vehicle according to an embodiment of the present disclosure.

FIG. 22 is a schematic diagram of a structure of a vehicle according to an embodiment of the present disclosure. As shown in FIG. 22, in an embodiment, a vehicle 22 is configured in a fully or partially autonomous driving mode. For example, the vehicle 22 may control the vehicle 22 in the autonomous driving mode, and may determine current conditions of the vehicle and an environment of the vehicle through human operations, determine possible behavior of at least one another vehicle in the environment, determine a possibility that the other vehicle performs the possible behavior, and further control the vehicle 22 based on the determined information. When the vehicle 22 is in the autonomous driving mode, the vehicle 22 may be set to operate without interaction with a person.

The vehicle 22 may include various subsystems, such as a drive system 220 (namely, the execution subsystem 113), a sensor system 221 (including the sensing subsystem 111 and the GNSS signal obtaining subsystem 114), a control system 222, one or more peripheral devices 223, a power supply 224, a user interface 225 (including the human machine interface 115), and a computer system 226 (namely, the decision subsystem 112). Optionally, the vehicle 22 may include fewer or more subsystems, and each subsystem may include a plurality of components. In addition, the subsystems and components of the vehicle 22 may be connected to each other in a wired or wireless manner.

The drive system 220 may include a component that provides power for the vehicle 22 to move. In an embodiment, the drive system 220 may include an engine, an energy source, a transmission device, and wheels/tires. The engine may be an internal combustion engine, an electric motor, an air compression engine, or a combination of other types of engines, for example, a hybrid engine including a gasoline engine and an electric motor, or a hybrid engine including an internal combustion engine and an air compression engine. The engine converts the energy source into mechanical energy.

Examples of the energy source include gasoline, diesel, other oil-based fuel, propane, other compressed gas-based fuel, ethanol, solar panels, batteries, and other power sources. The energy source may also provide energy for another system of the vehicle 22.

The transmission device may transfer mechanical power from the engine to the wheels. The transmission device may include a gearbox, a differential, and a drive shaft. The transmission device may also include other components, such as a clutch system. The drive shaft may include one or more shafts that may be coupled to one or more wheels.

The sensor system 221 may include several sensors that sense information about the environment of the vehicle 22. For example, the sensor system 221 may include a positioning system (the positioning system may be a GPS system, a BEIDOU system, or another positioning system), an inertial measurement unit (IMU), radar, a laser rangefinder, and a camera. The sensor system 221 may further include sensors (for example, an in-vehicle air quality monitor, a fuel gauge, and an oil temperature gauge) in an internal system of the monitored vehicle 22. One or more pieces of sensor data from these sensors maybe used to detect objects and corresponding features (a location, a shape, a direction, a speed, and the like) of the objects. Such detection and recognition are key functions of safe running of the vehicle 22.

The global positioning system may be configured to estimate a geographic location of the vehicle 22. The IMU is configured to sense location and orientation changes of the vehicle 22 based on inertial acceleration. The IMU can be a combination of an accelerometer and a gyroscope.

The radar may sense an object in the environment of the vehicle 22 by using a radio signal. In some embodiments, in addition an object, the radar may be further configured to sense a speed and/or a moving direction of the object.

The laser rangefinder may sense, by using a laser, an object in the environment of the vehicle 22. In some embodiments, the laser rangefinder may include one or more laser sources, a laser scanner, one or more detectors, and another system component.

The camera may be configured to capture a plurality of images of the environment of the vehicle 22. The camera may be a static camera or a video camera.

The control system 222 is configured to control the vehicle 22 and components of the vehicle to perform related operations. The control system 222 may include various components, including a steering system, a throttle, a brake unit, a computer vision system, a route control system, and an obstacle avoidance system.

The steering system may be configured to adjust a forward direction of the vehicle 22. For example, the steering system may be a steering wheel system.

The throttle is configured to control an operating speed of the engine and further control a speed of the vehicle 22.

The brake unit is configured to control the vehicle to decelerate. The brake unit may use friction to slow down the wheels. In another embodiment, the brake unit may convert kinetic energy of the wheels into a current. The brake unit may alternatively reduce a rotation speed of the wheels by using other methods, to control the speed of the vehicle.

The computer vision system may operate to process and analyze images captured by the camera to recognize objects and/or features in the environment of the vehicle 22. The objects and/or features may include traffic signals, road boundaries, and obstacles. The computer vision system may use an object recognition algorithm, a structure from motion (SFM) algorithm, video tracking, and other computer vision technologies. In some embodiments, the computer vision system may be configured to draw a map for an environment, track an object, estimate an object speed, and the like.

The route control system is configured to determine a running route of the vehicle 22. In some embodiments, the route control system may determine a running route for the vehicle 22 with reference to data from the sensor, the GPS, and one or more predetermined maps.

The obstacle avoidance system is configured to recognize, evaluate, and avoid or otherwise bypass a potential obstacle in the environment of the vehicle.

Certainly, in an instance, the control system 222 may additionally or alternatively include components other than those shown and described. Alternatively, the control system 222 may not include some of the foregoing components.

The vehicle 22 interacts with an external sensor, another vehicle, another computer system, or a user through the peripheral device 223. The peripheral device 223 may include a wireless communications system, a microphone, and/or a speaker.

In some embodiments, the peripheral device 223 and the user interface 225 provide a user with a means to interact with the user. In another case, the peripheral device 223 may provide a means for the vehicle 22 to communicate with another device in the vehicle. For example, the microphone may receive audio (for example, a voice command or another audio input) from the user of the vehicle 22. Likewise, the speaker may output audio to the user of the vehicle 22.

The wireless communications system may communicate wirelessly with one or more devices directly or over a communications network. For example, the wireless communications system may perform communication through a third generation (3G) cellular network such as CDMA, Evolution-Data Optimized (EVDO), or a GSM/General Packet Radio Service (GPRS), perform communication through a fourth generation (4G) cellular network such as LTE, or perform communication through a fifth generation (5G) cellular network. The wireless communications system may communicate with a wireless local area network (WLAN) by using WI-FI. In some embodiments, the wireless communications system may directly communicate with a device through an infrared link, BLUETOOTH, ZIGBEE, or the like. For example, the wireless communications system may include one or more short-range communications devices, and the devices may be used for public and/or private data communications between the vehicle and/or a roadside device.

The power supply 224 may supply power to various components of the vehicle 22. In an embodiment, the power supply 224 may be a rechargeable lithium-ion or lead-acid battery. One or more battery packs of such batteries may be configured as the power supply to supply power to the components of the vehicle 22. In some embodiments, the power supply 224 and the energy source may be implemented together. For example, a power supply and an energy source in an all-electric vehicle work together to supply power to the vehicle.

Some or all functions of the vehicle 22 are controlled by the computer system 226. The computer system 226 may include at least one processor. The processor executes instructions stored in a non-transient computer-readable medium such as a data storage apparatus. The computer system 226 may alternatively be a plurality of computing devices that control an individual component or a subsystem of the vehicle 22 in a distributed manner.

The processor may be any conventional processor such as a commercially available CPU. Alternatively, the processor may be a dedicated device such as an ASIC or another hardware-based processor. A person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer. Thus, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and wirelessly communicate with the vehicle. In other aspects, some of the processes described herein are performed on the processor disposed inside the vehicle, while others are performed by a remote processor. The processes include steps for performing a single operation.

In some embodiments, the data storage apparatus may include the instructions (for example, program logic), and the instructions may be executed by the processor to perform various functions of the vehicle 22, including the functions described above. The data storage apparatus may also include additional instructions, including instructions to send data to, receive data from, interact with, and/or control one or more of the drive system 220, the sensor system 221, the control system 222, and the peripheral device 223.

In addition to the instructions, the data storage apparatus may further store data, such as a road map, route information, a location, a direction, a speed, and other vehicle data of the vehicle, and other information. Such information may be used by the vehicle 22 and the computer system 226 when the vehicle 22 operates in an autonomous mode, a semi-autonomous mode, and/or a manual mode.

The user interface 225 is configured to provide information for or receive information from the user of the vehicle 22. Optionally, the user interface 225 may include one or more input/output devices in a set of the peripheral devices 223, for example, a wireless communications system, a microphone, and a speaker.

The computer system 226 may control functions of the vehicle 22 based on inputs received from various subsystems (for example, the drive system 220, the sensor system 221, and the control system 222) and from the user interface 225. For example, the computer system 226 may use an input from the control system 222 to control steering, to avoid an obstacle detected by the sensor system 221 and the obstacle avoidance system. In some embodiments, the computer system 226 may operate to provide control on the vehicle 22 and the subsystems of the vehicle 22 in many aspects.

Optionally, one or more of the foregoing components may be installed separately from or associated with the vehicle 22. For example, the data storage apparatus may be partially or totally separated from the vehicle 22. The foregoing components may be communicatively coupled together in a wired and/or wireless manner.

Optionally, the components are merely examples. In actual application, components in the foregoing modules may be added or deleted based on an actual requirement. FIG. 22 should not be construed as a limitation on the embodiments of the present disclosure.

An autonomous vehicle traveling on a road, such as the vehicle 22, may recognize objects in the environment of the vehicle 22 to determine to adjust a current speed. The objects may be the other vehicles, traffic control devices, or objects of other types. In some examples, the autonomous vehicle may independently consider each identified object, and may determine a to-be-adjusted speed of the autonomous vehicle based on characteristics of each identified object, such as a current speed of the object, acceleration of the object, and a distance between the object and the vehicle.

Optionally, the autonomous vehicle 22 or a computing device (such as the computer system 226, the computer vision system, and the data storage apparatus in FIG. 22) associated with the autonomous vehicle 22 may predict behavior of the identified object based on the feature of the identified object and a condition (for example, traffic, rain, or ice on a road) of the environment. Optionally, all the identified objects depend on behavior of each other, and therefore all the identified objects may be considered together to predict behavior of a single identified object. The vehicle 22 can adjust the speed of the vehicle 22 based on the predicted behavior of the identified object. In other words, the autonomous vehicle can determine, based on the predicted behavior of the object, that the vehicle needs to be adjusted (for example, acceleration, deceleration, or stop) to a stable condition. In this process, another factor may also be considered to determine the speed of the vehicle 22, for example, a horizontal location of the vehicle 22 on a road on which the vehicle runs, a curvature of the road, and proximity between a static object and a dynamic object.

In addition to an instruction for adjusting the speed of the autonomous vehicle, the computing device may further provide an instruction for modifying a steering angle of the vehicle 22, so that the autonomous vehicle can follow a given track and/or maintain a safe horizontal distance and a safe vertical distance from an object (for example, a car on a neighboring lane of the road) near the autonomous vehicle.

The vehicle 22 may be the vehicle 10, and may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited in the embodiments of the present disclosure.

The embodiments of the present disclosure further provide a computer-readable storage medium. The computer-readable storage medium may store a program, and the program may be executed to perform some or all of the steps described in the method embodiments corresponding to FIG. 5 to FIG. 17.

The embodiments of the present disclosure further provide a computer program. The computer program includes instructions. When the computer program is executed by a computer, the computer is enabled to perform some or all of the steps described in any one of the method embodiments corresponding to FIG. 5 to FIG. 17.

The embodiments of the present disclosure further provide a server. The server includes a processor and a memory. The processor invokes executable program code stored in the memory, to perform some or all of the steps described in the method embodiments corresponding to FIG. 5 to FIG. 17.

In the foregoing embodiments, description of the embodiments has respective focuses. For a part that is not described in detail in an embodiment, refer to related description in other embodiments.

It should be noted that, for brief description, the foregoing method embodiments are represented as a series of actions. However, a person skilled in the art should appreciate that this disclosure is not limited to the described sequence of the actions, because some steps may be performed in another sequence or simultaneously according to this disclosure. It should be further appreciated by persons skilled in the art that the embodiments described in this specification all belong to embodiments, and the involved actions and modules are not necessarily used in this disclosure.

In the several embodiments provided in this disclosure, it should be understood that the disclosed apparatus may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The foregoing units described as separate parts may or may not be physically separate, and parts displayed as units may or may not be physical units, may be located in one position, or may be distributed on a plurality of network units. Some or all of the units may be selected based on actual requirements to achieve the objective of the solutions of the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like, and may be further a processor in the computer device) to perform all or some of the steps of the methods described in the embodiments of this disclosure. The foregoing storage medium includes any medium that can store program code, such as a Universal Serial Bus (USB) flash drive, a removable hard disk, a magnetic disk, an optical disc, a ROM, or a RAM.

The foregoing embodiments are merely intended to describe the technical solutions of this disclosure, but not to limit this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this disclosure.

What is claimed is:

1. A method implemented by an automated driving system of a vehicle, wherein the method comprises:
    determining a first parameter set comprising a first environmental parameter set or a first operating parameter set of the automated driving system, wherein the first parameter set corresponds to an operational design domain (ODD) of the automated driving system for a target road section;
    obtaining a second parameter set comprising a second environmental parameter set, wherein the second environmental parameter set comprises a set of environmental parameters of the automated driving system on the target road section or a second operating parameter set comprising a set of operating parameters of the automated driving system on the target road section;
    determining, based on a first comparison of the first parameter set and the second parameter set, whether the automated driving system exceeds the ODD;
    in response to determining that the automated driving system exceeds the ODD based on the first comparison, reducing a speed of the vehicle, requesting a driver of the vehicle to take over, or stopping the vehicle;
    obtaining a third parameter set comprising a third environmental parameter set, wherein the third environmental parameter set and the first environmental parameter set do not intersect;
    determining, based on a second comparison of the third environmental parameter set and the second environmental parameter set, whether the automated driving system exceeds the ODD; and in response to determining that the automated driving system exceeds the ODD based on the second comparison, forbidding the vehicle to run.

2. The method of claim 1, further comprising:
identifying that the second parameter set is not a subset of the first parameter set; and
determining, based on the second parameter set not being the subset of the first parameter set, that the automated driving system exceeds the ODD.

3. The method of claim 2, wherein the first parameter set comprises one or more preset first objects, wherein the second parameter set comprises a second object, and wherein the method further comprises:
identifying that the second object is the same as a first object in the one or more preset first objects; and
determining, in response to the second object being the same as the first object and a value corresponding to the second object is not within a value range corresponding to the first object, that the automated driving system exceeds the ODD.

4. The method of claim 1, further comprising:
identifying that the second parameter set is a subset of the first parameter set; and
determining, based on the second parameter set being the subset of the first parameter set, that the automated driving system does not exceed the ODD.

5. The method of claim 1, further comprising:
receiving, from a road side unit or a cloud platform, ODD indication information; and
determining, based on the ODD indication information, at least one element of the second parameter set.

6. The method of claim 1, further comprising obtaining an element in the second parameter set or a value corresponding to the element using a sensor of the vehicle, a road side unit, or a cloud platform.

7. The method of claim 1, wherein the third environmental parameter set comprises one or more forbidden parameters that when met forbids the vehicle from running, and wherein the one or more forbidden parameters comprises a snowfall level forbidden parameter on the target road section.

8. The method of claim 1, further comprising:
identifying that the second environmental parameter set is not a first subset of the first environmental parameter set or the second operating parameter set is not a second subset of the first operating parameter set; and
determining, based on the second environmental parameter set not being the first subset of the first environmental parameter set or the second operating parameter set not being the second subset of the first operating parameter set, that the automated driving system exceeds the ODD.

9. The method of claim 1, wherein the second operating parameter set comprises a graphics processing unit (GPU) computing power of the automated driving system.

10. The method of claim 1, wherein the second parameter set comprises an object, and wherein the method further comprises:
sending, to a cloud platform, first information about the object; and
receiving, from the cloud platform, second information about whether the automated driving system exceeds the ODD.

11. An apparatus applied to an automated driving system of a vehicle and comprising:
a memory configured to store instructions; and
a processor coupled to the memory and configured to execute the instructions to cause the apparatus to:
determine a first parameter set comprising a first environmental parameter set of the automated driving system or a first operating parameter set of the automated driving system, wherein the first parameter corresponds to an operational design domain (ODD) of the automated driving system for a target road section;
obtain a second parameter set comprising a second environmental parameter set, wherein the second environmental parameter set comprises a set of environmental parameters of the automated driving system on the target road section or a second operating parameter set comprising a set of operating parameters of the automated driving system on the target road section;
determine, based on a first comparison of the first parameter set and the second parameter set, whether the automated driving system exceeds the ODD;
in response to determining that the automated driving system exceeds the ODD based on the first comparison, reduce a speed of the vehicle, request a driver of the vehicle to take over, or stopping the vehicle;
obtain a third parameter set comprising a third environmental parameter set, wherein the third environmental parameter set and the first environmental parameter set do not intersect;
determine, based on a second comparison of the third environmental parameter set and the second environmental parameter set, whether the automated driving system exceeds the ODD; and
in response to determining that the automated driving system exceeds the ODD based on the second comparison, forbid the vehicle to run.

12. The apparatus of claim 11, wherein the processor is further configured to execute the instructions to cause the apparatus to:
identifying that the second parameter set is not a subset of the first parameter set; and
determining, based on the second parameter set not being the subset of the first parameter set, that the automated driving system exceeds the ODD.

13. The apparatus of claim 12, wherein the first parameter set comprises one or more preset first objects, wherein the second parameter set comprises a second object, and wherein the processor is further configured to execute the instructions to cause the apparatus to:
identify that the second object is the same as a first object in the one or more preset first objects; and
determine, in response to the second object being the same as the first object and a value corresponding to the second object is not within a value range corresponding to the first object, that the automated driving system exceeds the ODD of the target road section.

14. The apparatus of claim 11, wherein the processor is further configured to execute the instructions to cause the apparatus to:
identify that the second parameter set is a subset of the first parameter set; and
determine, based on the second parameter set being the subset of the first parameter set, that the automated driving system does not exceed the ODD.

15. The apparatus of claim 11, wherein the processor is further configured to execute the instructions to cause the apparatus to:

receive, from a road side unit or a cloud platform, ODD indication information; and determine, based on the ODD indication information, at least one element of the second parameter set.

16. The apparatus of claim 11, wherein the processor is further configured to execute the instructions to cause the apparatus to obtain an element in the second parameter set or a value corresponding to the element using a sensor of the vehicle, a road side unit, or a cloud platform.

17. The apparatus of claim 11, wherein the third environmental parameter set comprises one or more forbidden parameters that when met forbids the vehicle from running, and wherein the one or more forbidden parameters comprises a snowfall level forbidden parameter on the target road section.

18. The apparatus of claim 11, wherein the processor is further configured to execute the instructions to cause the apparatus to:

identify that the second environmental parameter set is not a first subset of the first environmental parameter set or the second operating parameter set is not a second subset of the first operating parameter set; and determine, based on the second environmental parameter set not being the first subset of the first environmental parameter set or the second operating parameter set not being the second subset of the first operating parameter set, that the automated driving system exceeds the ODD.

19. The apparatus of claim 11, wherein the second operating parameter set comprises a graphics processing unit (GPU) computing power of the automated driving system.

20. The apparatus of claim 11, wherein the second parameter set comprises an object, and wherein the processor is further configured to execute the instructions to cause the apparatus to:

send, to a cloud platform, first information about the object; and receive, from the cloud platform, second information about whether the automated driving system exceeds the ODD.

* * * * *